United States Patent
Ko et al.

(10) Patent No.: US 10,942,510 B2
(45) Date of Patent: Mar. 9, 2021

(54) MOBILE ROBOT AND METHOD OF CONTROLLING THE SAME

(71) Applicant: LG ELECTRONICS INC., Seoul (KR)

(72) Inventors: Kyoungsuk Ko, Seoul (KR); Sungwook Lee, Seoul (KR); Jongjin Woo, Seoul (KR); Jaehoon Lee, Seoul (KR); Junghee Kim, Seoul (KR); Hyungsub Lee, Seoul (KR); Koh Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 145 days.

(21) Appl. No.: 16/205,452

(22) Filed: Nov. 30, 2018

(65) Prior Publication Data

US 2019/0163174 A1 May 30, 2019

(30) Foreign Application Priority Data

Nov. 30, 2017 (KR) .......................... 10-2017-0163668

(51) Int. Cl.
*G05D 1/00* (2006.01)
*G05D 1/02* (2020.01)
*A01D 34/00* (2006.01)

(52) U.S. Cl.
CPC ......... *G05D 1/0011* (2013.01); *A01D 34/008* (2013.01); *G05D 1/0088* (2013.01);
(Continued)

(58) Field of Classification Search
None
See application file for complete search history.

(56) References Cited

U.S. PATENT DOCUMENTS 7,953,526 B2 * 5/2011 Durkos ................ G05D 1/0272
701/25
9,237,689 B2 1/2016 Choi et al.
(Continued)

FOREIGN PATENT DOCUMENTS

| EP | 2 939 508 | 11/2015 |
| KR | 10-2015-0125508 | 11/2015 |
| KR | 10-2017-0004343 | 1/2017 |

OTHER PUBLICATIONS

Korean Office Action dated Apr. 23, 2019 issued in Application 10-2017-0163668.
(Continued)

*Primary Examiner* — Tamara L Weber
(74) *Attorney, Agent, or Firm* — KED & Associates LLP

(57) ABSTRACT

A mobile robot may include a controller configured to set a virtual boundary based on position information determined by a terminal or a position sensor in an area, and to set an area of any one side of the boundary as a traveling area. The controller may control a traveling unit so that a main body moves within the traveling area without moving outside the boundary. Accordingly, the controller may easily set the boundary using the position information, and may control traveling of the mobile robot by setting the traveling area formed by the boundary. The controller may correct a position error, may reflect information on obstacles in setting the traveling area to set a traveling area appropriate for a traveling environment of the mobile robot, and/or may easily change the set traveling area.

19 Claims, 15 Drawing Sheets

(52) U.S. Cl.
CPC ............ *G05D 1/02* (2013.01); *G05D 1/0219* (2013.01); *G05D 1/0225* (2013.01); *G05D 2201/0208* (2013.01)

(56) References Cited

U.S. PATENT DOCUMENTS

| | | |
|---|---|---|
| 9,420,741 B2 | 8/2016 | Balutis et al. |
| 9,471,063 B2 | 10/2016 | Ouyang |
| 2012/0265391 A1* | 10/2012 | Letsky ................. G05D 1/0088 701/25 |
| 2013/0041526 A1 | 2/2013 | Ouyang |
| 2014/0371909 A1 | 12/2014 | Lee et al. |
| 2016/0129593 A1* | 5/2016 | Wolowelsky ............ B25J 9/163 700/253 |
| 2016/0165795 A1 | 6/2016 | Balutis et al. |
| 2016/0291596 A1 | 10/2016 | Ebrahimi Afrouzi |
| 2016/0366818 A1* | 12/2016 | Ouyang ............... G05D 1/0219 |
| 2017/0000307 A1 | 1/2017 | Choi et al. |
| 2018/0143634 A1* | 5/2018 | Ott ....................... G05D 1/0214 |

OTHER PUBLICATIONS

European Search Report dated May 15, 2019 issued in Application 18209137.1.

\* cited by examiner (a)

(b)

(a)

(b)

MOBILE ROBOT AND METHOD OF CONTROLLING THE SAME

CROSS-REFERENCE TO RELATED APPLICATION

This application claims priority under 35 U.S.C. § 119 to Korean Application No. 10-2017-0163668, filed Nov. 30, 2017, the entire subject matter of which is hereby incorporated by reference.

BACKGROUND

1. Field

The present disclosure may relate to a mobile robot and a method of controlling the same. More particularly, the present disclosure may relate to a mobile robot that autonomously travels within a designated area, and a method of controlling the same.

2. Background

A mobile robot may be a device that autonomously travels in a predetermined area and automatically performs an operation without a user's manipulation. The mobile robot may sense an obstacle located within an area to perform an operation while approaching or avoiding the obstacle.

Examples of the mobile robot may include a robot cleaner that performs cleaning while traveling in an area, and a robotic lawn mower that mows a lawn on the ground in an area.

The lawn mower may be classified into a riding-type lawn mower in which a user rides the lawn mower for mowing the lawn or weeding the ground, and a walk-behind type or a hand carrying type for mowing the lawn while a user directly pushes or drags the lawn mower from behind. However, such a lawn mower may be cumbersome in that a user's direct manipulation of the device is required in order to move the lawn mower for mowing the lawn.

Research may be performed relating to a mobile robotic lawn mower, in which a mobile robot includes a device, apparatus or means for mowing the lawn.

The mobile robot for mowing the lawn (i.e., a robotic lawn mower) may operate in an outdoor area, rather than in an indoor area, such that the mobile robot may be required to set a traveling area of the mobile robot. In an indoor environment, movement may be limited by a wall or furniture. However, in an outdoor environment, there may be an open space such that the mobile robot may be required to designate an area, and to limit the area such that the mobile robot may travel in an area in which grass is planted.

Korean Laid-Open Patent Publication No. 2015-0125508, the subject matter of which is incorporated herein by reference, discloses a robot lawn mower in which a moving area of a robotic lawn mower is set by burying a wire in an area where the grass is planted, by controlling the lawn mower to move in an area inside the wire, and by setting a boundary for the robotic lawn mower by measuring voltage induced in the wire.

However, this type of method may be a problem because one must bury the wire on the ground, and in order to change the set boundary, the buried wire may be removed and another wire may be buried. Thus, it may be difficult to change the boundary of a moving area of the mobile robot.

When limiting movement of a mobile robot by setting a boundary, there may be a method of limiting movement of a mobile robot by setting a virtual wall using signals transmitted by a beacon. However, the virtual wall may be set only for linear movement. Thus, the method may not be suitable for use in an outdoor environment having various ground shapes. Moreover, in a wide area (i.e., larger than a predetermined size) various devices may be needed for setting such a virtual wall, thereby increasing costs. Additionally, the method may have a limitation in that the virtual wall may not be set for all areas.

The above reference(s) may be incorporated by reference herein where appropriate for appropriate teachings of additional or alternative details, features and/or technical background.

BRIEF DESCRIPTION OF THE DRAWINGS

Arrangements and embodiments may be described in detail with reference to the following drawings in which like reference numerals refer to like elements and wherein.

DETAILED DESCRIPTION

Advantages and features of embodiments, and a method of achieving the same may be more clearly understood from the following embodiments described in detail with reference to the accompanying drawings. However, embodiments are not limited to the following embodiments but may be implemented in various different forms. Embodiments may not be provided merely to complete disclosure and to fully provide a person having ordinary skill in the art, to which embodiments pertain. Wherever possible, the same reference numbers may be used throughout the specification to refer to the same or like parts. Further, in a mobile robot, a controller and each part may be implemented as one or more processors.

Figure 1:
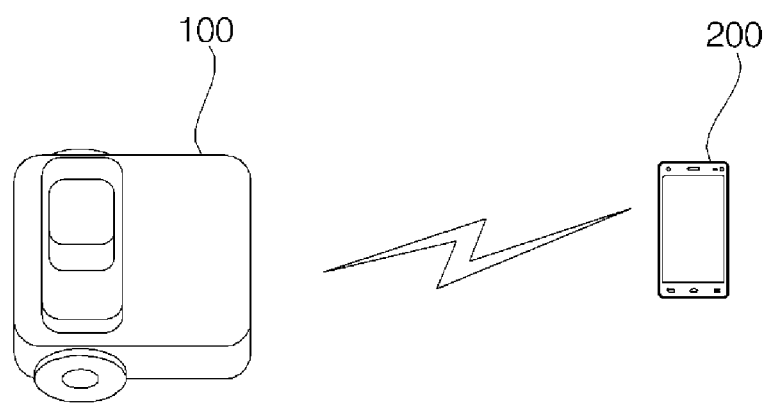
FIG. 1 is a diagram showing a mobile robot according to an example embodiment of the present disclosure.

FIG. 1 is a diagram showing a mobile robot according to an example embodiment of the present disclosure. Other embodiments and configurations may also be provided.

Referring to FIG. 1, a mobile robot 100 according to an example embodiment of the present disclosure may include: a casing that forms an exterior of a main body and a space to accommodate components of the main body; an obstacle sensor that is disposed at a front surface of the main body and senses an obstacle; and moving wheels (left wheel and right wheel) that enable the mobile robot 100 to move and rotate. Auxiliary wheels may also be provided on a front bottom surface of the main body. A battery may also be provided within the main body for providing driving power for traveling.

In an example in which the mobile robot 100 is a robot cleaner, the mobile robot 100 may include a suction unit (or suction device) to suck dust from a floor surface. In an example in which the mobile robot 100 is a robotic lawn mower, a weeding unit (or weeding device) may be provided on a front bottom surface or a bottom surface of the main body to mow the lawn at a regular height from the ground surface.

The following description may be provided using an example in which the mobile robot is a robotic lawn mower, although the mobile robot is not limited thereto and may also be applied to a robot cleaner in terms of a method of setting and changing an area using position information that may be described below, and may be applied to any other mobile robot that autonomously travels (or moves) in a predetermined area.

The mobile robot 100 may communicate with a terminal 200, which moves in a predetermined area, to receive data from the terminal 200. Based on the data received from the terminal 200, the mobile robot 100 may travel (or move) while following the position (or location) of the terminal 200.

Based on position information (or location information) received from the terminal 200 or collected when the mobile robot 100 moves while following the terminal 200, the mobile robot 100 may set a virtual boundary in (or at) a predetermined area, and may set an area of any one side, among areas formed by the boundary, as a traveling area. The mobile robot 100 may set an area inside the boundary as a traveling area.

Upon setting the boundary and the traveling area, the mobile robot 100 may travel within the set traveling area without moving outside the boundary.

The mobile robot 100 may receive data on an area and a boundary thereof which are set by the terminal 200, and the mobile robot 100 may set a virtual boundary in an outdoor area to travel in the set area without moving outside the boundary.

The mobile robot 100 may mow the lawn while traveling in a traveling area (or at a traveling area).

In at least one example embodiment, the terminal 200 may set a boundary for the mobile robot 100 and may transmit the set boundary to the mobile robot 100.

Upon changing or extending an area, the terminal 200 may transmit information on the changed area to the mobile robot 100 so that the mobile robot 100 may travel in a new area. The terminal 200 may display, on a screen, data received from the mobile robot 100 to monitor operation of the mobile robot 100.

According to a state of a battery (such as a charging state), the mobile robot 100 may stop an operation that is currently being performed, and the mobile robot 100 may return to a charging station (or charger) to perform charging. The mobile robot 100 may transmit, to the terminal 200, data on a current state such that a message, indicating that the mobile robot 100 is being charged, may be output to the terminal 200. The charging station may send or provide a guidance signal for guiding the mobile robot 100 to return to (or move) to the charging station. The mobile robot 100 may return (or move) to the charging station upon receipt of the guidance signal.

Figure 2:
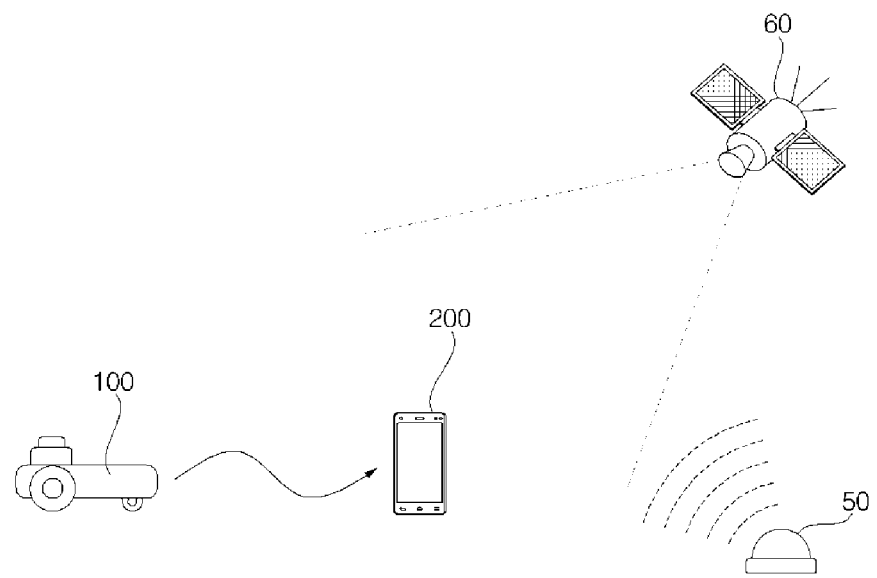
FIG. 2 is a diagram showing a device for setting an area of the mobile robot of FIG. 1.
Figure 2:
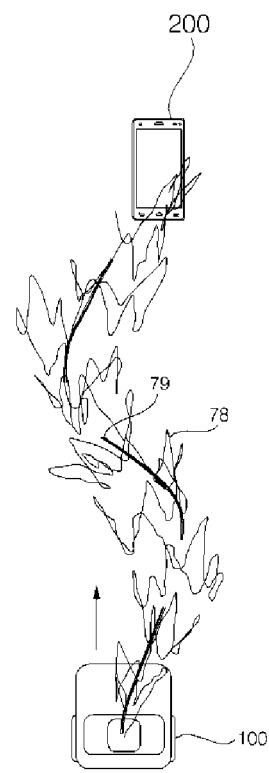
Figure 3:
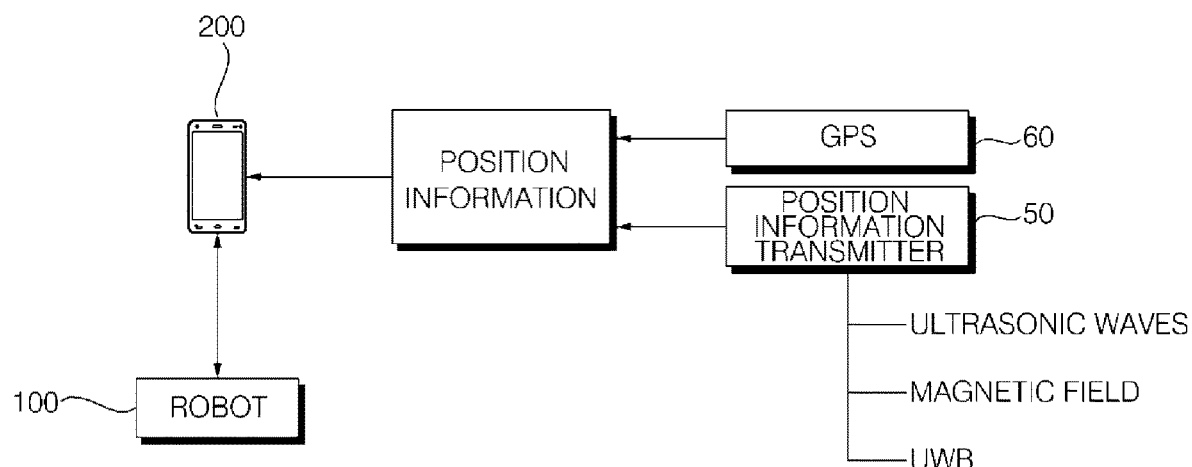
FIG. 3 is a diagram for explaining a signal flow between devices for setting an area of the mobile robot of FIG. 2.

FIG. 2 is a diagram showing a device for setting an area of the mobile robot of FIG. 1. FIG. 3 is a diagram for explaining a signal flow between devices for setting an area of the mobile robot of FIG. 2. Other embodiments and configurations may also be provided.

As shown in (a) of FIG. 2, while traveling in a set area, the mobile robot 100 or the terminal 200 may determine a current position (or location) by receiving position information. The mobile robot 100 and the terminal 200 may determine a current position based on position information transmitted (or received) from a position information transmitter 50 (or position information transmitters) installed in (or at) a traveling area and/or on a periphery thereof, and/or based on a GPS signal obtained from a GPS satellite 60 (or satellites). The mobile robot 100 and the terminal 200 may calculate (or determine) a current position by receiving signals transmitted from at least three position information transmitters, and comparing the received signals.

The mobile robot 100 may set any one point in the traveling area as a reference position (or a reference point), and calculate (or determine) coordinates of a position while the mobile robot is moving. For example, the mobile robot 100 may set an initial starting position or a position of the charging station as a reference position, and/or may set a position of any one of the position information transmitters as a reference position to calculate (or determine) coordinates of the traveling area.

For example, in an example in which the mobile robot 100 starts to operate at any one point in (or at) the traveling area, the mobile robot 100 may not determine a current position. Accordingly, by setting a point, such as a fixed position of the charging station, as a reference position, the mobile robot 100 may easily determine a position at every operation.

Additionally, the mobile robot 100 may set an initial position at every operation as a reference position in order to determine a position while the mobile robot 100 is moving.

Based on the reference position (or reference location), the mobile robot 100 may calculate (or determine) a moving distance based on wheel RPM, a moving speed, a direction of rotation (sensor value of a gyro sensor), and/or the like, and the mobile robot 100 may calculate (or determine) a current position in the traveling area based on the calculated moving distance. Even when determining a current position by using a GPS signal, the mobile robot 100 may determine a position by setting one point as a reference position.

As shown in (b) of FIG. 2, the mobile robot 100 may receive a signal from the terminal 200, and the mobile robot 100 may move (or travel) while following a changed position of the terminal 200.

The following of the mobile robot 100 may refer to movement of the mobile robot 100 by rotation of the wheels while maintaining a predetermined distance from the terminal 200 when the terminal 200 moves, and "following" or "actively following" which may be described below, may be defined as active movement of the mobile robot 100.

When a user moves while carrying the terminal 200, the position of the terminal 200 may change as the user walks. However, the position change may be complicated since the user's arms move back and forth. A moving trajectory of the terminal 200 as a user walks may be calculated (or determined) by excluding some complicated and slight position changes from among the position changes of the terminal 200. Accordingly, the mobile robot 100 may calculate (or determine) a moving trajectory of the terminal 200 to move while following the terminal 200 by a predetermined distance (or less than a predetermined distance).

The mobile robot 100 may move while following the terminal 200 based on a relative position with respect to the position of the terminal 200. In addition to the relative position with respect to the terminal 200, the mobile robot 100 may move by calculating (or determining) a position within the traveling area. By setting any point in (or at) the traveling area as a reference position, the mobile robot 100 may calculate (or determine) a current position based on a moving distance and a moving direction. The mobile robot 100 may store coordinates of the current position.

As described above, when the mobile robot 100 moves while following the terminal 200, the terminal 200 may set a following mode, and may transmit a predetermined position signal. The mobile robot 100 may move while following the terminal 200 by receiving a position signal transmitted from the terminal 200.

When the mobile robot 100 moves while following the terminal 200, the mobile robot 100 may sense a user positioned in a traveling direction, and may move with a predetermined distance from the user so as not to collide with the user, but maintain a distance from the user so as not to be spaced apart from the user by more than a predetermined distance.

As shown in FIG. 3, the terminal 200 and position information may be used to set a traveling area of the mobile robot 100.

The position information may be received from the position information transmitter 50 (or transmitters) and/or the GPS satellite 60, as discussed above. The position information signal may include a GPS signal, an ultrasonic wave signal, an infrared signal, an electromagnetic signal, and/or an Ultra Wide Band (UWB) signal.

The mobile robot 100 may collect position information to set a traveling area and a boundary.

The mobile robot 100 may collect position information by setting any one point in the traveling area as a reference position. As described above, the mobile robot 100 may set, as a reference position, any one of an initial starting position, a position of the charging station, and/or a position of any one of the position information transmitters. Upon setting the reference position, the mobile robot 100 may generate and store coordinates and a map of the traveling area based on the reference position. Upon generating the map, the mobile robot 100 may move based on the stored map.

The mobile robot 100 may set a new reference position every time the mobile robot 100 operates, and may determine a position in the traveling area based on the newly set reference position.

The mobile robot 100 may receive position information collected from the terminal 200 that moves on a predetermined path along a periphery of an area set as a traveling area. The terminal 200 may move alone. The path may be a random path on which the terminal 200 moves, and may be changed according to a subject that moves the terminal 200. In at least one example, the terminal 200 moves along the periphery of the traveling area, since the terminal 200 moves for the purpose of setting a traveling area of the mobile robot 100.

The terminal 200 may calculate (or determine) coordinates of a position in the traveling area based on the reference position.

Additionally, the mobile robot 100 may collect position information while following the terminal 200. When the terminal 200 moves along a predetermined path, the mobile robot 100 may move to follow the terminal 200.

When moving alone on a predetermined path, the terminal 200 may calculate (or determine) its current position by receiving position information from the GPS or the position information transmitter(s).

The mobile robot 100 and the terminal 200 may move by setting the same reference position in the traveling area. In an example in which the reference position is changed at every operation, the terminal 200 may move upon setting a reference position, and may transmit the collected position information along with the reference position to the mobile robot 100. The mobile robot 100 may receive data on the reference position set by the terminal 200, and may set a boundary by determining the received position information based on the reference position.

While following the terminal 200, the mobile robot 100 may calculate (or determine) its current position by receiving position information transmitted from the GPS or the position information transmitter(s).

While following the terminal 200, the mobile robot 100 may collect obstacle information and determine whether a path is passable, such that the mobile robot 100 may travel differently from a moving trajectory of the terminal 200. The mobile robot 100 may store obstacle information collected by the terminal 200, and may set a boundary by reflecting the stored obstacle information in setting a traveling area.

As described above, the terminal 200 may move as a user walks, and an area in which a user may move is different from an area in which the mobile robot 100 may move, such that there is a difference between a moving trajectory of the terminal 200 and a traveling path of the mobile robot 100.

A new obstacle may appear while the mobile robot 100 travels such that the mobile robot 100 stores obstacle information while traveling in an area, and stores information on a changed path, to change a predetermined traveling area.

While traveling in a predetermined traveling area, the mobile robot 100 may distinguish between areas the mobile robot 100 may and may not travel, and may change a predetermined traveling area and a boundary thereof based on information on obstacles sensed while traveling.

In this manner, by following the terminal 200 based on position information received from the GPS or the position information transmitter(s), the mobile robot 100 may set a traveling area and a boundary thereof.

The mobile robot 100 may follow the terminal 200 by receiving a signal (e.g., a GPS signal or a UWB signal) from the terminal 200 as position information of the terminal 200. In an example in which the mobile robot 100 moves alone, the mobile robot 100 may determine a position by receiving position information from the GPS satellite (or satellites) or the position information transmitter(s). The mobile robot 100 may travel in a traveling area (or at the traveling area) by generating a map of the traveling area based on the collected position information.

Figure 4:
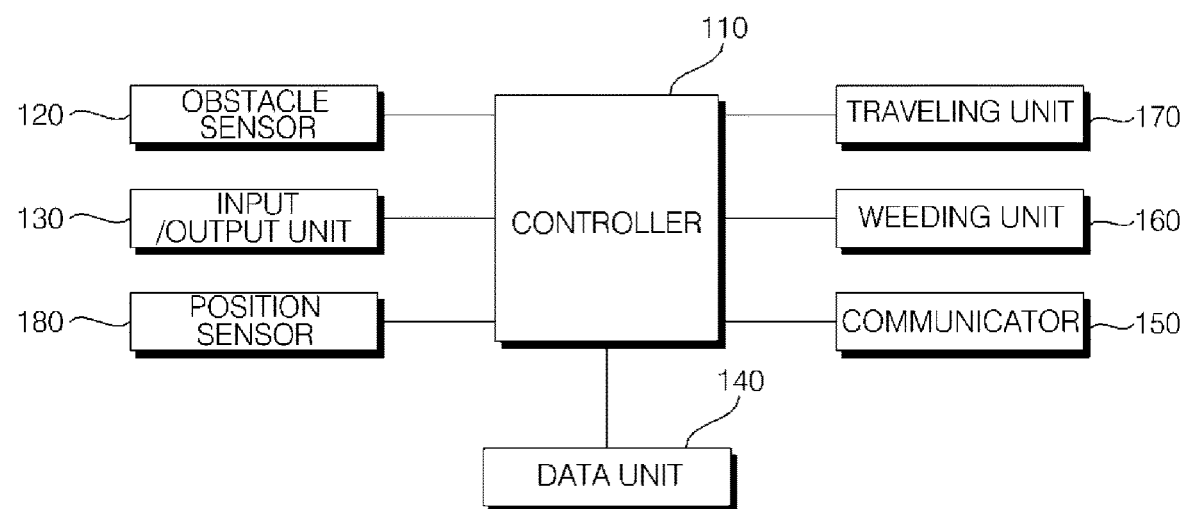
FIG. 4 is a block diagram showing components of a mobile robot according to an example embodiment of the present disclosure.

FIG. 4 is a block diagram showing components of a mobile robot according to an example embodiment of the present disclosure. Other embodiments and configurations may also be provided.

As shown in FIG. 4, the mobile robot 100 may include an obstacle sensor 120, an input/output unit 130, a traveling unit 170, a weeding unit 160, a communicator 150, a data unit 140, and a controller 110 that controls overall operation of the mobile robot. The controller 110 is hardware or structural component.

The input/output unit 130 may be a structural component of the mobile robot 100. The input/output unit 130 may be considered an input/output device or apparatus. The input/output unit 130 may include: an input means having at least one button, a switch, a touch pad, and the like, and an output means such as a display, a speaker, and the like, so as to receive an input of a user's command, and to output an operating state of the mobile robot 100.

The data unit 140 may be a structural component of the mobile robot 100. The data unit 140 may be considered a data device, a data apparatus, a memory device, and/or a memory. The data unit 140 may store the input sensing signal, reference data for determining an obstacle, and/or obstacle information on the sensed obstacle. Additionally, the data unit 140 may store control data for controlling operation of the mobile robot 100, and data according to a cleaning mode of the mobile robot 100.

The data unit 140 may store the collected position information, and information on a traveling area and a boundary thereof.

The data unit 140 may store data readable by a microprocessor, and may include Hard Disk Drive (HDD), Solid State Disk (SSD), Silicon Disk Drive (SDD), ROM, RAM, CD-ROM, a magnetic tape, a floppy disc, and/or an optical data storage device.

The communicator 150 may be a structural component of the mobile robot 100. The communicator 150 may also be called a communicator device. The communicator 150 may communicate with a terminal by wireless communication, for example. The communicator 150 may be connected to a predetermined network to communicate with an external server or a terminal that controls the mobile robot 100.

The communicator 150 may transmit the generated map to the terminal 200, receive a command from the terminal 200, and/or transmit, to the terminal 200, data on an operating state of the mobile robot 100. The communicator 150 may transmit and receive data by using a communication module (or communication device) including not only a near-field wireless communication such as Zigbee communication, Bluetooth communication, and/or the like, but also WIFI communication, WiBro communication, and/or the like.

The traveling unit 170 may be a structural component of the mobile robot 100. The traveling unit 170 may also be called a traveling device or apparatus. The traveling unit 170 may include at least one driving motor to enable the mobile robot 100 to travel according to a control command of the controller 110. The traveling unit 170 may include a left wheel driving motor that rotates a left wheel, and a right wheel driving motor that rotates a right wheel, and may further include an auxiliary wheel. In an example in which a main body travels straight, the left wheel driving motor and the right wheel driving motor may rotate in a same direction, but when the left wheel driving motor and the right wheel driving motor rotate at different speeds or in opposite directions, the traveling direction of the main body may be changed. At least one auxiliary wheel may also be provided to stably support the main body.

The weeding unit 160 may be a structural component of the mobile robot 100. The weeding unit 160 may be called a weeding device, a weeding apparatus and/or a weeder. The weeding unit 160 may mow the lawn while the mobile robot 100 moves. The weeding unit 160 may be provided with a brush or a blade for mowing the lawn, so that the weeding unit 160 may mow the lawn by rotation of the brush or the blade.

The obstacle sensor 120 may be a structural component of the mobile robot 100. The obstacle sensor 120 may include a plurality of sensors to sense an obstacle in a traveling direction of the mobile robot. The obstacle sensor 120 may sense an obstacle in front of the main body (i.e., in a traveling direction) by using at least one of a laser, ultrasonic waves, infrared, and a 3D sensor. The obstacle sensor 120 may include a cliff sensor that is disposed on a rear surface of the main body to sense a cliff.

The obstacle sensor 120 may include a camera for capturing a forward image to sense an obstacle. The camera may be a digital camera including an image sensor and an image processor. The image sensor may be a device that converts an optical image into an electrical signal, and may be formed as a chip having a plurality of photodiodes integrated therein. For example, the photodiodes may be pixels. When light, having passed through the lens, forms an image on the chip, charges may be accumulated in the respective pixels constructing the image, and the charges accumulated in the pixels may be converted into an electrical signal (e.g., voltage). As an example, a Charge Coupled Device (CCD), a Complementary Metal Oxide Semiconductor (CMOS), and/or the like, may be used as the image sensor. The camera may include an image processor (DSP) that processes a captured image.

The position sensor 180 may be a structural component of the mobile robot 100. The position sensor 180 may include a plurality of sensor modules for transmitting and receiving position information.

The position sensor 180 may include a GPS module for transmitting and receiving a GPS signal, a position sensor module for transmitting and receiving position information with a position information transmitter(s). In an example in which the position information transmitter transmits a signal by using at least one of ultrasonic waves, Ultra Wide Band (UWB), and infrared, a sensor module may be provided for transmitting and receiving an ultrasonic wave signal, a UWB signal, and/or an infrared signal. Additionally, in an example in which the mobile robot 100 moves while following the terminal 200, the sensor module may be used to determine a position.

UWB wireless technology may refer to communication technology using an ultra wide frequency band of more than several GHz in a baseband, rather than using a radio frequency (RF) carrier. The UWB wireless technology may use very short pulses of nanoseconds or picoseconds. The pulses transmitted by the UWB sensor are in nanoseconds or picoseconds, such that the pulses have high penetrability. Thus, even when there is a nearby obstacle, very short pulses transmitted by another UWB sensor may be received. The UWB sensor may include a transmitter and a receiver that are provided into one module.

In an example in which the mobile robot 100 moves while following the terminals, each of the terminal 200 and the mobile robot 100 may include the UWB sensor, and thus may perform wireless communication with each other. The terminal 200 may transmit a signal through the UWB sensor, and the mobile robot 100 may determine a position of the terminal 200 based on the signal from the terminal 200 received through the UWB sensor, so as to follow the terminal 200. The terminal 200 may be on the transmitting side, and the mobile robot 100 may be on the receiving side.

As described above, a signal of the UWB sensor may be transmitted while penetrating an obstacle, such that even when a user moves while carrying the terminal, signal transmission may not be affected. However, in an example of an obstacle having a size larger than a predetermined size, a signal may not be transmitted, or a transmission distance may become shorter although a signal is transmitted.

Additionally, the UWB sensor, included in each of the terminal 200 and the mobile robot 100, may measure (or determine) a distance between sensors, and may control traveling of the mobile robot 100 to maintain a distance between the mobile robot 100 and the terminal 200, so that the mobile robot 100 is not spaced apart from the terminal 200 by more than a predetermined distance.

The mobile robot 100 may include a plurality of UWB sensors. In an example in which the mobile robot 100 includes two UWB sensors (e.g., on the left side and the right side respectively), each of the sensors receive signals so that the mobile robot 100 may calculate (or determine) a position accurately by comparing the received signals. For example, according to a position of the mobile robot 100 and the terminal 200, in an example in which a distance measured by the left sensor is different from a distance measured by the right sensor, a relative position of the mobile robot 100 and the terminal 200 and a direction of the mobile robot 100 may be determined based on the received signals.

In an example in which a position information transmitter transmits a signal by using a UWB sensor included therein, the terminal 200 may receive the signal of the position information transmitter through the UWB sensor. In this example, a signal transmission method of the position information transmitter and a method of signal transmission between the mobile robot 100 and the terminal 200 may be the same or may be different from each other.

The terminal 200 may transmit an ultrasonic wave signal, and the mobile robot 100 may follow the terminal 200 by receiving the ultrasonic wave signal from the terminal 200.

In another example, a marker may be attached to the terminal 200, and the mobile robot 100 may follow the terminal 200 by recognizing the marker by capturing an image in a traveling direction.

In response to a signal received from the sensor module, the controller 110 may determine a traveling direction and control the traveling unit 170. Additionally, according to a distance from the terminal 200 that is received from the sensor module, the controller 110 may control the mobile robot 100 to travel or stop, and control the traveling unit 170 by varying a traveling speed. Accordingly, the mobile robot 100 may follow the terminal 200 according to a position change of the terminal 200.

The mobile robot 100 may include at least one tilt sensor to sense movement of a main body. When the main body is tilted forward, rearward, leftward, and/or rightward from the main body, the mobile robot 100 may calculate (or determine) a tilted direction and a tilted angle. In this example, the tilt sensor, an acceleration sensor, and/or the like may be used, in which any one of a gyro acceleration sensor, an inertial acceleration sensor, and/or a silicon semiconductor acceleration sensor may be used as an acceleration sensor. Additionally, various sensors or devices may be used to sense movement of the main body.

Additionally, the mobile robot 100 may further include a floor condition sensor to sense a floor condition of an area to be cleaned, and may also use a sensor of the obstacle sensor or a camera to sense the floor condition.

The controller 110 may control input and output of data, and control the traveling unit 170 so that the mobile robot 100 may travel according to a set mode. The controller 110 may control the travel unit 170 to independently operate the left wheel driving motor and the right wheel driving motor, so that the main body may travel straight or rotate.

The controller 110 may control the mobile robot 100 to move while following the terminal 200 according to a set mode, and the controller 110 may set a virtual boundary of an area based on position information received from the terminal 200 or position information calculated (or determined) by the position sensor. The controller 110 may set any one of areas, formed by the set boundary, as a traveling area. The controller 110 may set a boundary in a closed loop shape by connecting each point of discontinuous positions in a straight line or a curved line, and may set an area inside the boundary as a traveling area. Further, when setting a plurality of boundaries, the controller 110 may set any one of areas formed by the boundaries as a traveling area.

Upon setting the traveling area and the boundary thereof, the controller 110 may control the traveling unit 170 to travel within the set traveling area without moving outside the boundary. The controller 110 may calculate (or determine) a current position based on the received position information, and control the calculated current position to be within the traveling area formed by the boundary.

Additionally, the controller 110 may determine obstacle information input (or received) by the obstacle sensor 120 to control the traveling unit 170 to travel while avoiding an obstacle, and change a predetermined traveling area in at least one example.

The controller 110 may change a moving direction or a traveling path according to obstacle information input by the obstacle sensor, and control the traveling unit 170 to travel while passing through or avoiding an obstacle.

The controller 110 may determine a position (or location) of an obstacle based on the obstacle information, and set a direction to avoid the obstacle by determining a type of an obstacle. Upon sensing a cliff, the controller 110 may control the traveling unit 170 not to move to the cliff by more than a predetermined distance.

Upon sensing an obstacle, the controller 110 may transmit traveling information to the terminal 200, and may display the traveling information on the terminal 200 so that a traveling direction may be changed by a user's selection that is input to the terminal 200.

Figure 5:
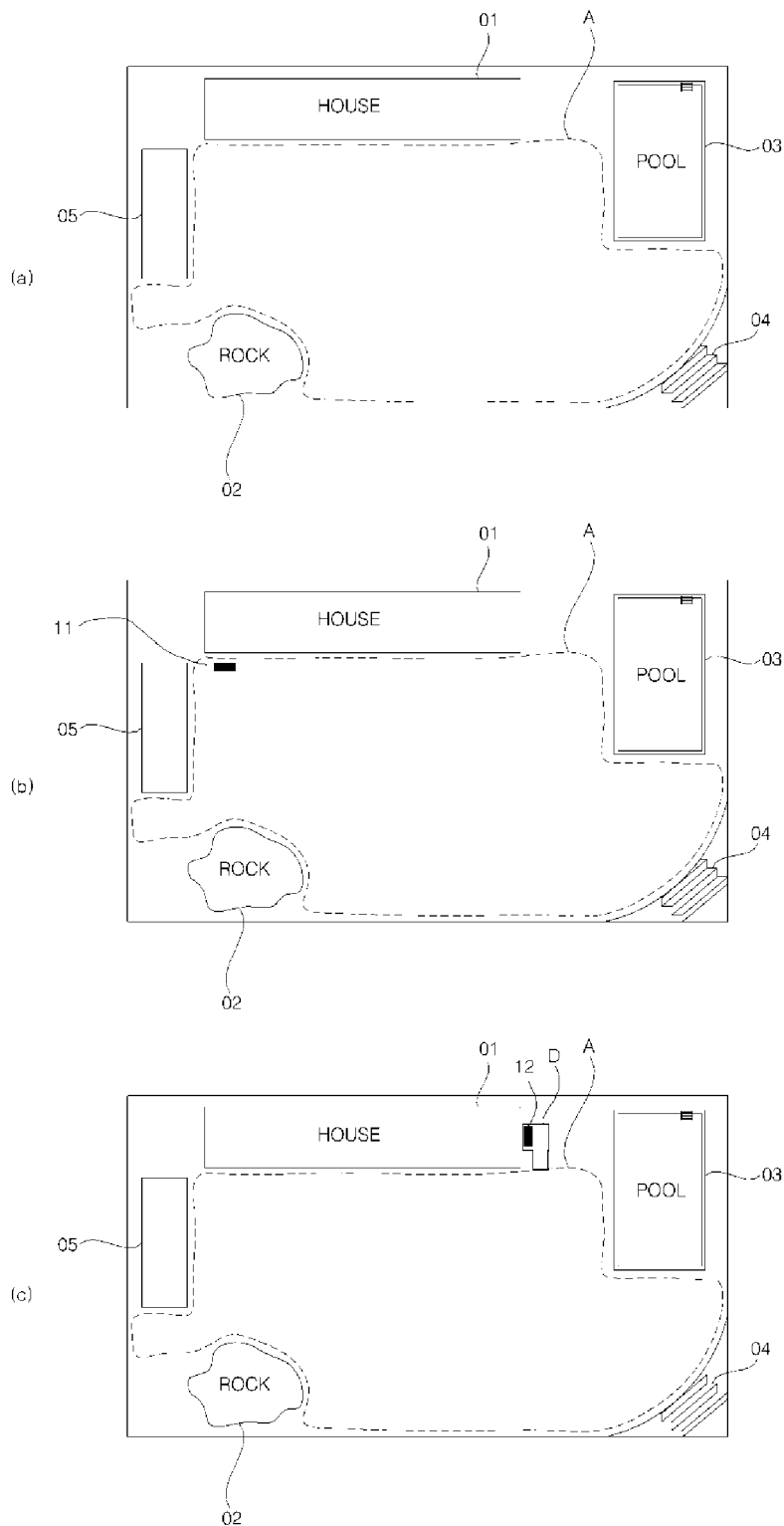
FIG. 5 is an exemplary diagram for explaining a traveling area of a mobile robot according to an example embodiment of the present disclosure.

FIG. 5 is an exemplary diagram for explaining a traveling area of a mobile robot according to an example embodiment of the present disclosure. Other embodiments and configurations may also be provided.

As shown in (a) of FIG. 5, the mobile robot 100 may mow the lawn while moving in a set traveling area of an outdoor area. By setting a boundary of an area, the mobile robot 100 may set an area to travel while mowing the lawn as a traveling area A.

By setting the boundary, the mobile robot 100 may travel without moving outside the traveling area, such that the mobile robot 100 may be restricted from approaching an area other than the lawn or an obstacle area.

The mobile robot 100 may set a boundary to avoid a plurality of nearby obstacles such as a house 01, a rock 02, a pool 03, stairs 04, a garden 05, a pond, and/or the like.

The terminal 200 may collect position information while moving, and may transmit the collected position information to the mobile robot 100.

The mobile robot 100 may receive the position information from the terminal 200 or may collect the position information. By using the received or collected position information, the mobile robot 100 may set a boundary by connecting each point in a straight line or a curved line, and may set an area of any one side, among areas formed by the boundary, as a traveling area. The terminal 200 may set a boundary based on the position information, set a traveling area thereof, and transmit the traveling area to the mobile robot 100.

The mobile robot 100 and the terminal 200 set a reference position in the area, calculate coordinates of each point in the area based on the reference position, and store position information of each point.

When a plurality of areas are formed, the mobile robot 100 may transmit the plurality of areas to the terminal 200 so that at least one area may be selected through the terminal 200. The terminal 200 may provide a menu so that at least one area may be selected by a user's input.

Upon setting a traveling area, the mobile robot 100 may move in a designated traveling area A without moving outside a boundary of the traveling area A. The mobile robot 100 may move inside the traveling area with a periphery thereof being set as a boundary line.

By using the position information, the terminal 200 may set a traveling area at an initial stage of operation, and the mobile robot 100 may change a traveling area based on information on an obstacle sensed while actually traveling in the traveling area set by the terminal 200. While the terminal 200 moves to set a traveling area, the mobile robot 100 may also move while following the terminal 200, to collect obstacle information and change the traveling area based on the obstacle information.

As shown in (b) and (c) of FIG. 5, the mobile robot 100 may set a position of charging stations 11 and 12. When the mobile robot 100 needs to be charged to obtain power for traveling, the mobile robot 100 may be required to stop performing a predetermined operation (based on the state of a battery) and the mobile robot may need to return to the charging stations 11 and 12 (for charging). Accordingly, the mobile robot 100 may set the position of the charging stations 11 and 12 so that the main body (or mobile robot) may return to the charging stations 11 and 12 (when charging is required).

Before or after setting the boundary, the mobile robot 100 may set the position of the charging stations 11 and 12 based on a reference position in the traveling area. The mobile robot 100 may also set the position (or location) of the charging stations 11 and 12 based on the set boundary.

The mobile robot 100 may determine whether the charging stations 11 and 12 are located inside the traveling area A or outside the traveling area A.

When the charging station 11 is located inside the traveling area A, the controller 110 may return the mobile robot to the charging station 11 when charging is required.

Alternatively, when the charging station 12 is located in an area other than the traveling area A (i.e., outside the boundary), the controller 110 may control the traveling unit 170 to move outside the boundary to return the mobile robot to the charging station 12 when charging is required.

During operation, the mobile robot 100 may travel so as not to move outside the boundary. However, when charging is required, the mobile robot 100 may move to the charging station 12 by ignoring the boundary. Even when returning to the charging station 12, the mobile robot 100 may travel while avoiding an obstacle based on pre-stored obstacle information. For example, the mobile robot 100 may set a charging station return mode, temporarily cancel a mode for setting a traveling area, in which the mobile robot 100 travels along the boundary in the charging station return mode, and detects the charging station 12 based on the sensed obstacle information to return to the charging station 12.

Additionally, when the charging station 12 is located in an area outside the boundary, the mobile robot 100 may set at least one moving area D between the charging station 12 and the traveling area A. The mobile robot 100 may basically travel in the traveling area so as not to move outside the boundary. However, when the mobile robot 100 is required to return to the charging station or needs to be returned for charging, the mobile robot 100 should travel in an area, other than the traveling area, to return to the charging station. As such, the mobile robot 100 sets the moving area D to return to the charging station 12. The controller 110 may include the moving area D in the traveling area A.

For example, when the mobile robot 100 sets a boundary in a closed loop shape, the mobile robot 100 may set the moving area D from any one point, which is a start point and an end point, to the charging station. The mobile robot 100 may distinguish between the moving area D and the traveling area A, and may mow the lawn only in the traveling area A. Based on a ground condition (or surface property) of the moving area D, the mobile robot 100 may mow the lawn in a portion where there is the lawn. In a portion of the moving area that is included in the traveling area, the mobile robot 100 may mow the lawn while moving.

Figure 6:
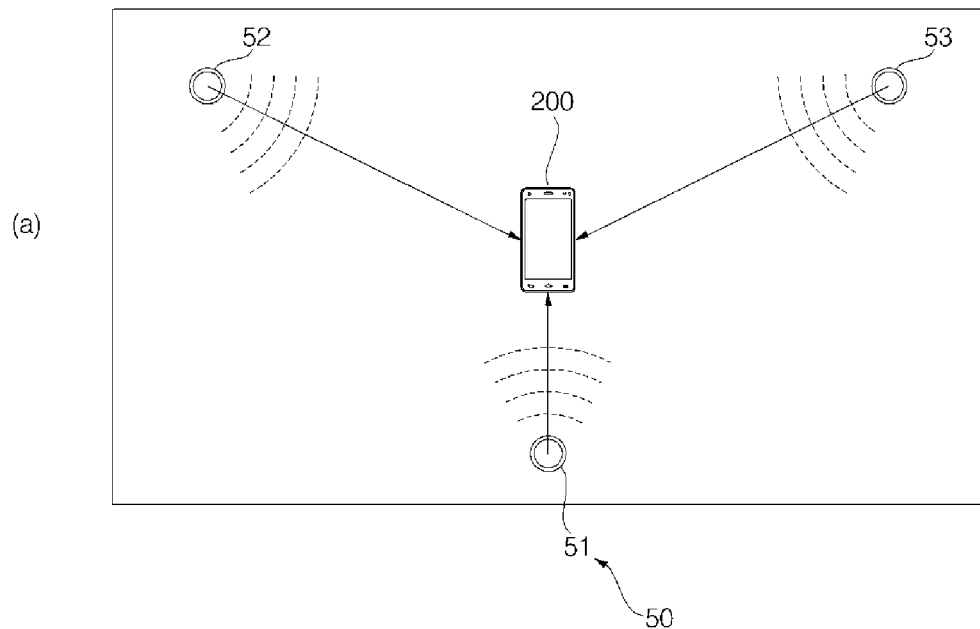
FIG. 6 is a diagram for explaining a method of calculating a position of a terminal according to an example embodiment of the present disclosure.
Figure 6:
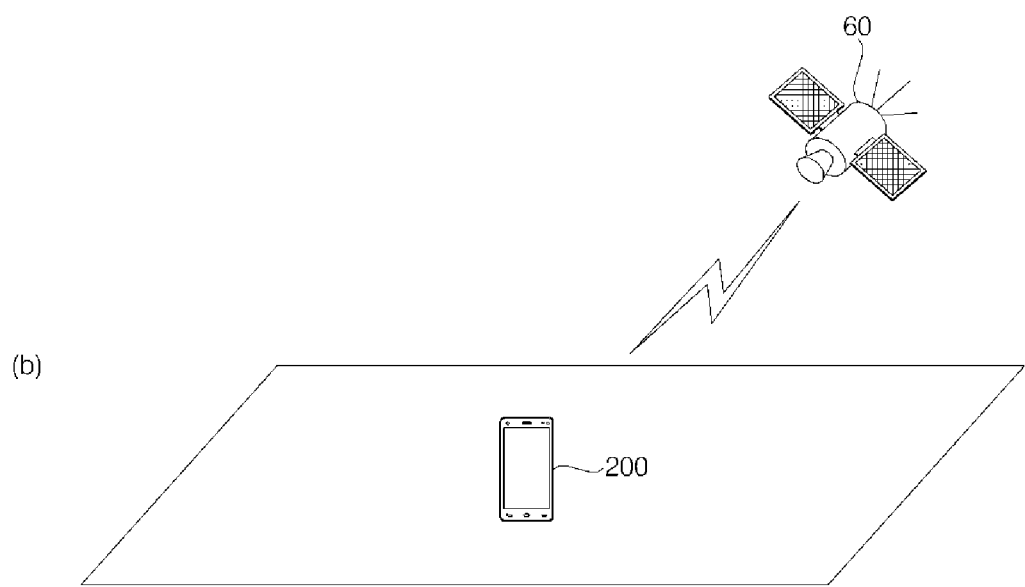

FIG. 6 is a diagram for explaining a method of calculating a position of a terminal according to an example embodiment of the present disclosure. Other embodiments and configurations may also be provided.

The mobile robot 100 or the terminal 200 may set a reference position in an area, and determine a current position by recognizing coordinates of a position in the area based on the reference position.

As shown in (a) of FIG. 6, while moving for setting a traveling area of the mobile robot 100, the terminal 200 may calculate (or determine) a position based on position information transmitted from a plurality of position information transmitters 51, 52, 53 located in an outdoor area.

The terminal 200 may calculate (or determine) a position by analyzing received signals, and storing position information. The terminal 200 may calculate (or determine) coordinates based on a position of each of the position information transmitters 51, 52, 53 based on power of signals of the plurality of position information transmitters.

The position information transmitter 50 (or transmitters) may be installed either inside or outside the traveling area as described above (such as in FIG. 5), but the position information transmitter 50 may be installed adjacent to a set boundary. The position information transmitter 50 may be installed (or provided) at a position that allows the terminal 200 or the mobile robot 100 to receive a signal transmitted from the position information transmitter 50.

In at least one embodiment, at least three position information transmitters 50 may be installed. The position information transmitter 50 may be additionally installed depending on signal coverage, a size of an area, a number of obstacles having a size larger than a predetermined size, and/or the like.

The position information transmitter 50 may transmit a predetermined signal such as a UWB signal, an ultrasonic wave signal, an infrared signal, and/or the like.

The terminal 200 may analyze each of the signals transmitted from first to third position information transmitters, and determine a current position by setting (or determining) coordinates based on positions of the first to the third position information transmitters.

For example, the position information transmitter 50 may transmit a UWB signal. The first to the third position information transmitters may transmit UWB signals, which include intrinsic information so that the signals may be differentiated from each other.

The terminal 200 may include a UWB sensor to receive the UWB signals transmitted by the position information transmitter. The terminal 200 may calculate (or determine) a distance and a direction to each of the first, the second, and the third position information transmitters by differentiating the UWB signals, and the terminal 200 may determine its current position based on the calculation.

For example, when setting a reference position by using each of the first position information transmitter and the second position information transmitter as an axis, the terminal 200 may set the position of the first position information transmitter 51 as coordinates (x, 0), the second position information transmitter 52 as coordinates (0, y), and the third position information transmitter 53 as coordinates (p, q).

The terminal 200 may calculate (or determine) its coordinates (m, n) by calculating a distance and a direction to each of the first, the second, and the third position information transmitters based on the signals received from the first, the second, and the third position information transmitters.

As shown in (b) of FIG. 6, the terminal 200 may determine a position by receiving signals from the GPS satellite 60 (or satellites).

The terminal 200 may store positions determined continuously while moving.

When determining a position based on the GPS signal, the position may be determined in units of meters, such that an error may occur. Accordingly, when determining a position by using the GPS signal, the terminal 200 or the mobile robot 100 may use a reference position to reduce an error, and change a boundary by performing a test travel for a set boundary.

The terminal 200 or the mobile robot 100 may set a boundary by connecting each point of discontinuous positions, and set an area inside the boundary as a traveling area. By analyzing a plurality of positions, and excluding a maximum position change value, and an overlapping value (i.e., a value representing the same point while the terminal 200 or the mobile robot 100 is in a stationary state), the terminal 200 or the mobile robot 100 may calculate (or determine) a boundary by generating a moving line by connecting each point.

Figure 7:
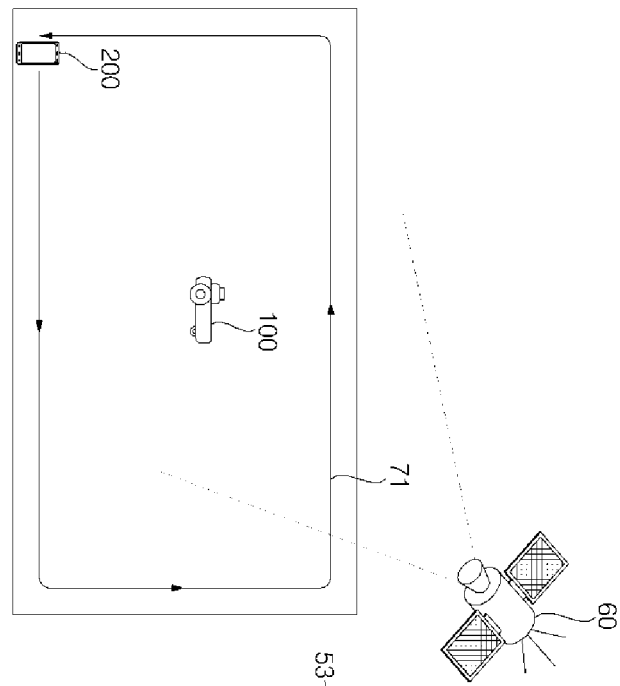
FIG. 7 is an exemplary diagram for explaining a method of setting an area of a mobile robot by using a terminal according to an example embodiment of the present disclosure.
Figure 7:
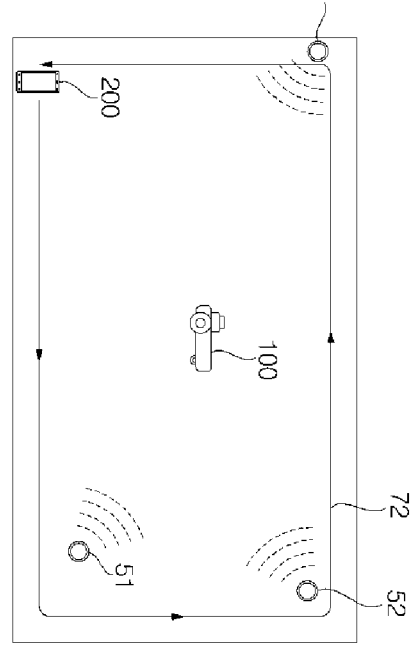

FIG. 7 is an exemplary diagram for explaining a method of setting an area of a mobile robot by using a terminal according to an example embodiment of the present disclosure. Other embodiments and configurations may also be provided.

A method of setting a traveling area and a boundary thereof for a mobile robot at an initial stage of operation may now be described.

As shown in (a) of FIG. 7, while the mobile robot 100 is in a stationary state, the terminal 200 may move alone in an area along a first path 71.

The terminal 200 may receive a GPS signal from the GPS satellite 60, and determine its current position based on the received signal. The terminal 200 may store position information, and since the position of the terminal 200 changes as the terminal 200 moves, the terminal 200 may store coordinates of positions at regular intervals.

The terminal 200 may set a traveling area so that the mobile robot 100 may mow the lawn in an area having a predetermined range. Accordingly, based on the periphery of an area in which the grass is planted, the terminal 200 may move along the first path 71. The following description is made using an example where a subject that moves the terminal 200 is a user; however, as will be described below, a remote control (RC) car or a drone may also be used, and/or a moving apparatus (or moving means), which may be controlled by a user, may also be used.

As shown in (b) of FIG. 7, while the mobile robot 100 is in a stationary state, the terminal 200 may calculate (or determine) its position by analyzing signals received from the plurality of position information transmitters 51, 52, 53 installed in the area while the terminal 200 moves in the area.

As described above, at least three position information transmitters may be installed.

The terminal 200 may set a traveling area so that the mobile robot 100 may mow the lawn in an area of a predetermined range. Accordingly, the terminal 200 may move on a second path 72 along a boundary of a target area. The second path 72 may be the same as the first path 71, but may be changed according to a subject that moves the terminal 200.

As described herein, the terminal 200 may move along the second path 72, and receive signals from the position information transmitters at predetermined time intervals (while the terminal 200 is moving). The terminal 200 may calculate (or determine) its current position by comparing the received three signals, and store position information at predetermined time intervals. The terminal 200 may store the position information as coordinate values based on the position of each of the position information transmitters.

The terminal 200 may calculate (or determine) a distance and a direction to each of the position information transmitters 51, 52, 53 by comparing signal power of the first, the second, and the third position information transmitters 51, 52, 53, and calculate (or determine) its position based on the calculation.

The terminal 200 may record changed positions based on position information by receiving signals from the GPS satellite and/or the position information transmitters 51, 52, 53, and upon completing movement, the terminal 200 may transmit the stored position information to the mobile robot 100.

The mobile robot 100 may set a boundary by connecting coordinates of the position information, and set an area inside the boundary as a traveling area of the mobile robot 100. In at least one example, the terminal 200 may set a boundary based on the position information, and may transmit the set boundary and the traveling area to the mobile robot 100.

The mobile robot 100 may perform a test travel of the set traveling area.

The mobile robot 100 may store information on an obstacle sensed during test travel, and change the traveling area and the boundary so as to avoid the obstacle while traveling. Upon sensing a new obstacle or when an existing obstacle is removed, the mobile robot 100 may reflect the information and change the traveling area and the boundary.

There may be a difference between an area of the terminal 200 moved by a user and an actual traveling area of the mobile robot 100, such that the mobile robot 100 performs a test travel to change the set traveling area and the boundary.

For example, when there is a rock having a diameter of about 10 cm at a position adjacent to the boundary of the traveling area, a user may simply pass over the rock to move straight ahead; however, the mobile robot 100 may not pass over the rock, but may avoid the rock by turning to the left or the right, and the mobile robot 100 may change a portion of the boundary of the traveling area based on a changed path.

In an example in which the terminal 200 moves alone, the terminal 200 is not required to move according to an actual traveling speed of the mobile robot 100, and/or the terminal 200 may move fast to collect position information, thereby setting the boundary and the traveling area in a short time.

However, as described above, when the terminal 200 collects a position with respect to a boundary, there may be a difference in terms of an actual traveling environment of the mobile robot 100 and a moving apparatus (or moving means) that moves the terminal 200, as well as the obtained obstacle information such that it is required to change a boundary based on a traveling area of the mobile robot 100.

An example in which the terminal 200 moves alone and fails to receive a signal while moving, the terminal 200 may move ahead without knowing that it fails to receive the signal, and thus may not obtain position information on a portion of an area, thereby causing a difference in accuracy.

In this example, the mobile robot 100 may perform a test travel to change the boundary.

Figure 8:
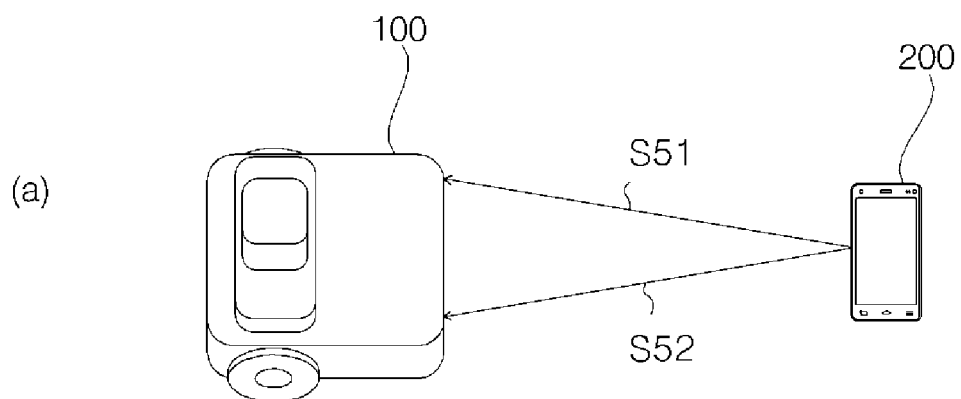
FIG. 8 is an exemplary diagram for explaining a method of setting an area by a mobile robot that moves while following a terminal according to an example embodiment of the present disclosure.
Figure 8:
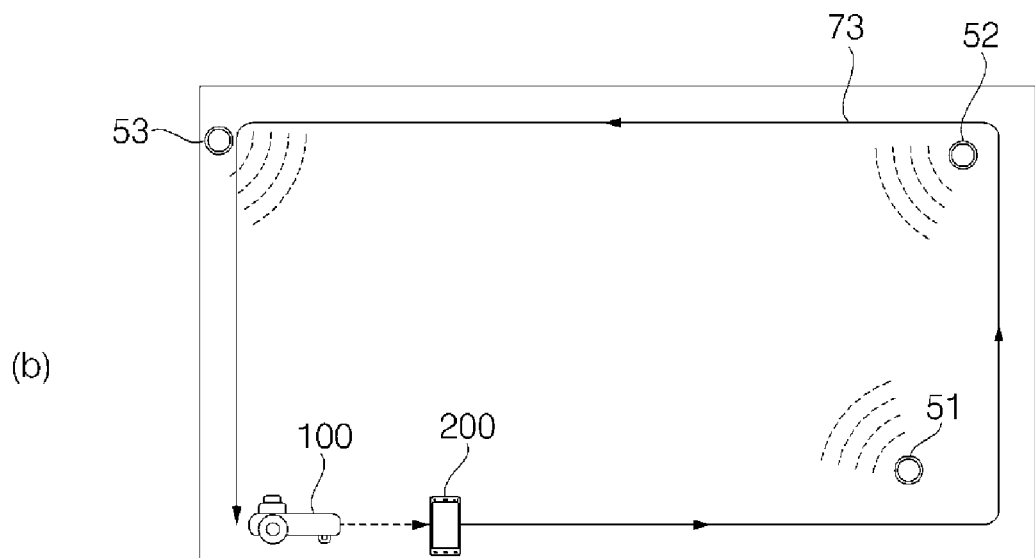

FIG. 8 is an exemplary diagram for explaining a method of setting an area by a mobile robot that moves while following a terminal according to an example embodiment of the present disclosure. Other embodiments and configurations may also be provided.

As shown in (a) of FIG. 8, the mobile robot 100 may set a traveling area without stopping by following the terminal 200 that moves along a predetermined path.

By using signals S51 and S52 received from a sensor, included in the mobile robot 100, or from the terminal 200, the mobile robot 100 may follow the terminal 200, while maintaining a predetermined distance from the terminal 200, as the terminal 200 changes its position. The signals S51 and S52 may be differentiated signals received from each sensor, and the signals transmitted from the terminal 200 are the same.

The terminal 200 may transmit one signal, and a total number of signals to be received by the mobile robot 100 may vary according to a total number of sensors included in the mobile robot 100. For example, when the terminal 200 transmits one signal, the signal may be received by each of two sensors of the mobile robot 100. The terminal 200 may also transmit a plurality of signals.

The mobile robot 100 may avoid an obstacle sensed while following the terminal 200, and may record a position change due to the obstacle.

As shown in (b) of FIG. 8, the mobile robot 100 may set a traveling area by moving while following the terminal 200. The terminal 200 may calculate (or determine) a position in an outdoor area based on signals from the plurality of position information transmitters 51, 52, 53 while moving, and the terminal 200 may transmit the position information to the mobile robot 100.

The terminal 200 may transmit a UWB signal, and the mobile robot 100 may receive the UWB signal transmitted by the terminal 200. The mobile robot 100 may follow the terminal 200 by calculating a direction and a distance to the terminal 200 based on the UWB signal, to determine a relative position with respect to the terminal 200, and by controlling traveling to move to the position of the terminal 200. The mobile robot 100 may follow the terminal 200 while maintaining a predetermined distance from the terminal 200.

The mobile robot 100 may include a plurality of UWB sensors, and the mobile robot 100 may travel (or move) by calculating (or determining) an accurate position and direction of the terminal 200 by comparing two UWB signals.

In this example embodiment, position information may be transmitted from not only the position information transmitters, but also the GPS satellite as described above.

When the mobile robot 100 moves while following the terminal 200, the mobile robot 100 may store position information, may set a boundary based on the stored position information, and may set an area formed by the boundary as a traveling area.

The mobile robot 100 may set a final traveling area and a boundary thereof by changing the traveling area set by the terminal 200 based on data stored in the mobile robot 100.

When the mobile robot 100 moves while following the terminal 200, the mobile robot 100 may move by aligning with the terminal 100 by matching the position of the terminal 200 with a center position of the mobile robot 100. According to outdoor environment and position information of the terminal 200, the mobile robot 100 may match its left or right position with the position of the terminal 200 to move by aligning with any one side of the mobile robot 100.

The mobile robot 100 may store information on an obstacle sensed while following the terminal 200. In an example embodiment in which the mobile robot 100 may not move straight while following the terminal 200 due to an obstacle, the mobile robot 100 may travel by selecting either one of the left side or the right side.

A traveling path may be selected through the terminal 200, and the mobile robot 100 may travel in any one direction according to a user's input. The mobile robot 100 may autonomously determine a traveling path while traveling, and may determine a final traveling area by setting a path to avoid an obstacle according to a user's input and by changing a traveling area.

Figure 9:
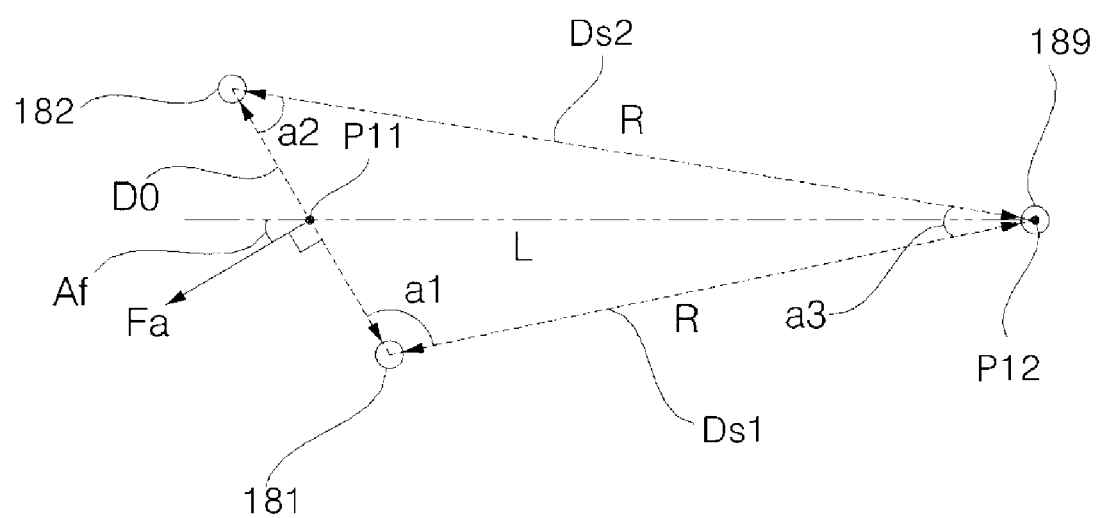
FIG. 9 is a diagram for explaining a method of a mobile robot following a terminal according to an example embodiment of the present disclosure.

FIG. 9 is a diagram for explaining a method of following a terminal by a mobile robot according to an example embodiment of the present disclosure. Other embodiments and configurations may also be provided.

As described above, the mobile robot 100 may receive a signal from the terminal 200, and may move while following the terminal 200 by determining a moving direction of the terminal 200 and a distance from the terminal 200.

The mobile robot 100 may receive a signal from the terminal 200 through the position sensor 180. As shown in FIG. 9, the position sensor 180 may include a first sensor 181 and a second sensor 182 which are installed at different distances from the mobile robot 100. The following description is provided based on an example in which the mobile robot 100 is provided with two sensors, although the number of sensors is not limited thereto.

The position sensor 180 may receive signals from a GPS satellite (or satellites), a position information transmitter (or transmitters), and/or the terminal 200. The position sensor 180 may receive a GPS signal, an ultrasonic wave signal, an infrared signal, an electromagnetic signal, and/or an Ultra Wide Band (UWB) signal.

The position sensor 180 may receive an ultrasonic wave signal, an infrared signal, an electromagnetic signal, and/or an Ultra Wide Band (UWB) signal, which are transmitted from the terminal 200, so that the mobile robot (or main body) may follow the terminal 200.

The first sensor 181 and the second sensor 182 may be spaced apart on the main body of the mobile robot 100 by a predetermined distance in a horizontal direction. A distance between the first sensor 181 and the second sensor 182 may be a fixed distance D0.

The first sensor 181 and the second sensor 182 may receive signals from a sensor 189 of the terminal 200 as a first signal S51 and a second signal S52, respectively.

According to the position of the terminal 200, a distance between the first sensor 181 and the second sensor 182 and the terminal 200 may change. By defining a distance between the position of the sensor 189 (of the terminal 200) and the first sensor 181 as a first variable distance Ds1, and a distance between the position of the sensor 189 (of the terminal 200) and the second sensor 182 as a second variable distance Ds2, each of the first sensor 181 and the second sensor 182 calculates (or determines) the variable distances by receiving signals from the terminal 200.

The position sensor 180 may sense the position of the terminal 200, a distance from the terminal 200, and a moving direction of the terminal 200 when the main body of the mobile robot 100 moves (or travels) while following the terminal 200.

The position sensor 180 may sense a distance from the terminal 200 at predetermined time intervals. The first sensor 181 and the second sensor 182 may sense the first and the second variable distances based on the received signals.

For example, when the terminal 200 and the mobile robot 100 move therebetween on a straight line in the same direction with a predetermined distance, the position sensor 180 may sense that the first variable distance and the sensed second variable distance have the same value. When the mobile robot 100 is located on a right rear side of the terminal 200, the position sensor 180 may sense that the second variable distance has a larger value than the first variable value. Further, when the mobile robot 100 is located on a left rear side of the terminal 200, the position sensor 180 may sense that the first variable distance has a larger value than the second variable value.

The position sensor 180 may determine a relative position of the terminal 200.

Additionally, once a predetermined fixed distance D0 and the two sensed variable distances Ds1 and Ds2 are input, only one triangle having three sides D0, Ds1, and Ds2 is determined. Information processing may be performed based on the assumption that the fixed distance D0 and the two variable distances Ds1 and Ds2 are the distances on a single horizontal surface.

Once the predetermined fixed distance D0 and the two variable distances Ds1 and Ds2 are input, values of internal angles a1, a2, and a3 are determined, as well as a relative distance L between the terminal 200 and the mobile robot 100. Information processing may be performed based on the assumption that the relative distance L is a distance on a horizontal surface. In this example, "determined" may mean that a value is generated, which is to be obtained by information processing using a computer and/or the like.

The relative distance L may be understood differently depending on a distance between any one point of the mobile robot 100 and any one point of the terminal 200. However, as shown in FIG. 9, the relative distance L may refer to a distance between a point P11 of the mobile robot 100 and a point P12 of the terminal 200. The point P11 (of the mobile robot 100) is a middle point between the first sensor 181 and the second sensor 182, and the point P12 (of the terminal 200) is a position of the sensor 189 (included in the terminal 200). Each of the points P11 and P12 may change according to a setting. A line, which is formed by connecting the mobile robot 100 and the terminal 200 and represents the relative distance L, may be defined as a 'reference line'.

The first sensor 181 and the second sensor 182 may be spaced apart from each other on the left side and the right side of the mobile robot 100.

The position sensor 180 may sense the variable distances Ds1 and Ds2 based on signals received from the first sensor 181 and the second sensor 182 at any one time point, and the position sensor 180 may calculate the relative distance L.

The position sensor 180 may estimate a facing direction Fa based on the sensed variable directions Ds1 and Ds2.

The controller 110 may estimate a facing direction Fa of the mobile robot 100 based on the variable distances Ds1 and Ds2. The facing direction Fa may be a relative direction with respect to a virtual reference line. The facing direction Fa may be estimated as a direction that forms a facing angle Af with respect to a virtual reference line.

The facing direction Fa may be estimated differently according to time. Based on the variable distances Ds1 and Ds2 at any one time point, the facing direction Fa may be estimated as a direction that forms an angle Af with respect to a virtual reference line. At that time point, each relative distance L may be estimated.

Based on the variable distances and facing directions that are sensed repeatedly as the terminal 200 moves, the controller 110 may control a moving direction of the main body of the mobile robot 100. The controller 100 may compare a variable distance and a facing direction sensed at any one time point with a variable distance and a facing direction sensed after a predetermined lapse of time, and may estimate a relative position of the terminal 200 and the mobile robot 100 based on a change (or changes) in the variable distance and the facing direction. The controller 110 may estimate a moving path of the mobile robot 100 and the terminal 200. The controller 110 may estimate a direction the terminal 200 faces with respect to the mobile robot 100. Accordingly, the controller 100 may determine a moving direction of the mobile robot 100 for following the terminal 200.

Figure 10:
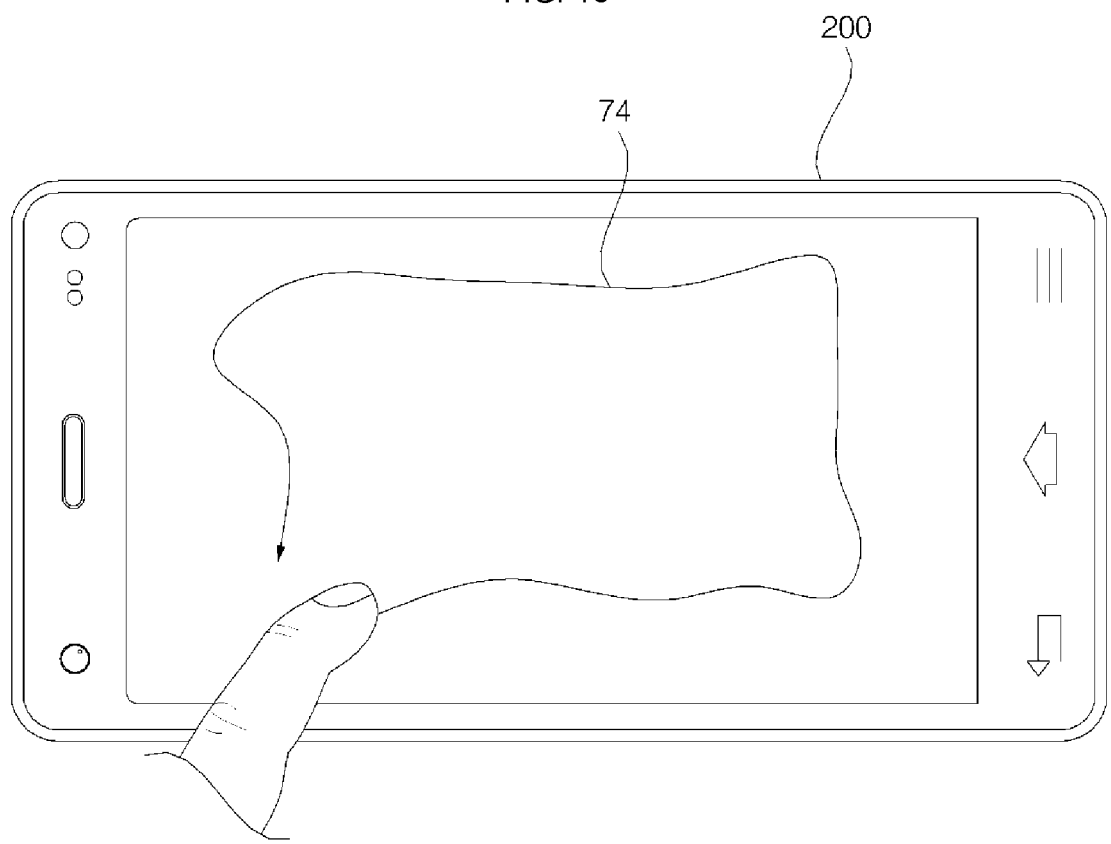
FIG. 10 is a diagram showing another example of a method of setting an area of a mobile robot according to an example embodiment of the present disclosure.

FIG. 10 is a diagram illustrating another example of a method of setting an area of a mobile robot according to an example embodiment of the present disclosure. Other embodiments and configurations may also be provided.

As shown in FIG. 10, the terminal 200 may display a shape of an area in which the mobile robot 100 is to mow the lawn, for example.

In response to a user's touch-and-drag input, the terminal 200 may set a traveling area of the mobile robot 100. The terminal 200 may set a boundary of a traveling area according to a direction 74 and a position of the touch-and-drag input.

The terminal 200 may display a predetermined traveling area on a screen using methods described above with respect to FIGS. 7 and 8, and the terminal may change a traveling area in response to the user's touch-and-drag input.

A traveling area with respect to an actual position in an outdoor area may be set based on coordinates of an outdoor area displayed on the screen of the terminal 200, and coordinates of a matched position of the outdoor area displayed on the screen of the terminal 200.

The mobile robot 100 may travel based on a set traveling area, and during initial test travel, the mobile robot 100 may change a portion of the traveling area and the boundary according to a traveling environment.

Figure 11:
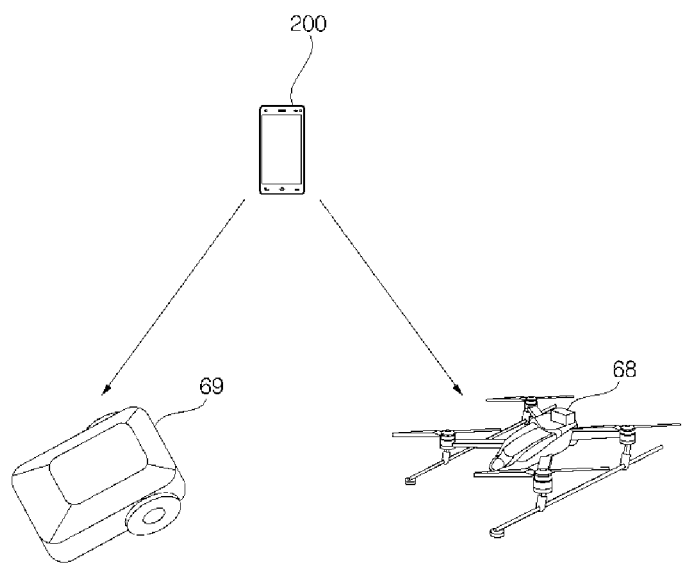
FIG. 11 is an exemplary diagram showing an example of a device for setting a traveling area of a mobile robot according to an example embodiment of the present disclosure.

FIG. 11 is an exemplary diagram illustrating an example of a device for setting a traveling area of a mobile robot according to an example embodiment of the present disclosure. Other embodiments and configurations may also be provided.

As described above, the terminal 200 may be moved by a user for setting a traveling area. When the user moves along a predetermined path on the periphery of an area while carrying the terminal 200, the mobile robot 100 may move while following the terminal 200, record coordinates as the position changes, and set a traveling area by connecting coordinates.

The terminal 200 may be moved not only by a user, but also by other moving devices (or means) controlled by a user, such as remote control (RC) car 69 or a drone 68, to which the terminal 200 is fixed, as shown in FIG. 11. Based on a position change of the terminal 200 according to movement of the RC car 69 or the drone 68, a traveling area and a boundary thereof may be set for the mobile robot 100.

In the example in which a set area has a size larger than a predetermined size, and it is difficult for a user to walk through the area, the terminal 200 may be moved using the RC car 69 or the drone 68, and may be moved by a transport means driven by a user.

Even in an example of setting a traveling area of the mobile robot 100 by using the RC car 69 or the drone 68, the terminal 200 may also calculate the position by using the position information transmitter (or transmitters) or the GPS satellite (or satellites) installed in the area.

Figure 12:
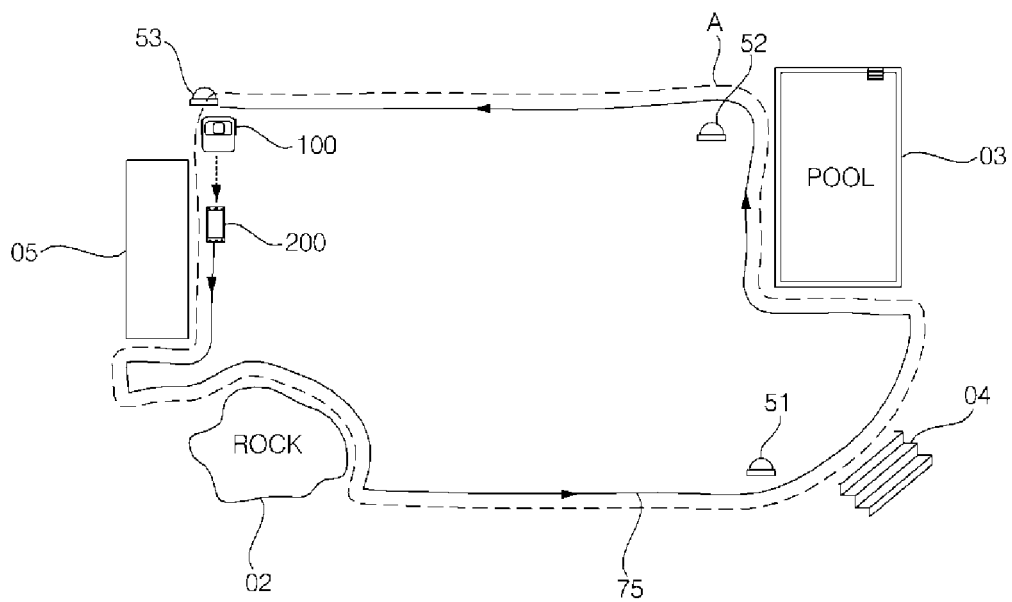
FIG. 12 is an exemplary diagram illustrating an example of setting a boundary of a traveling area of a mobile robot according to an example embodiment of the present disclosure.

FIG. 12 is an exemplary diagram showing an example of setting a boundary of a traveling area of a mobile robot according to an example embodiment of the present disclosure. Other embodiments and configurations may also be provided.

As shown in FIG. 12, a plurality of obstacles (shown as the elements 02 to 05) are located in an outdoor area in which the mobile robot 100 is to travel, as described above. The mobile robot 100 may set a traveling area and a boundary thereof in the outdoor area, and mow the lawn while traveling in the traveling area.

Based on the above-described embodiments, the following description may be made by the mobile robot 100 moving while following the terminal 200 for setting the traveling area of the mobile robot 100.

When the terminal 200 moves in an outdoor area, the mobile robot 100 may follow the terminal 200 by using position information of the terminal 200 or a sensor. The mobile robot 100 may move while following the terminal 200 by receiving position information from the terminal 200, and/or by receiving a signal of a sensor transmitted from the terminal 200. Additionally, when a user moves while carrying the terminal 200, a position change of the user is the same as the position change of the terminal 200, and as such that the mobile robot 100 may sense the user to follow the terminal 200.

For setting a traveling area of the mobile robot 100, the terminal 200 may move along a predetermined path 75 on a periphery of the area. While moving, the terminal 200 may receive signals of the plurality of position information transmitters 51, 52, 53 located in the area, and the terminal 200 may calculate the position of the terminal 200 by comparing power of the received signals. The terminal 200 may calculate a position by receiving a GPS signal (or signals).

The position information transmitter (or transmitters) may be installed at any one point of the area, and may be installed inside or outside the area based on a traveling area to be set later. However, the position information transmitters may be located adjacent to a boundary of a traveling area.

In an example in which there is an obstacle having a size larger than a predetermined size in the traveling area, the position information transmitter (or transmitters) may be further installed for signal transmission. In an example in which the area is enlarged, the position information transmitter (or transmitters) may be installed according to a signal transmission distance.

In response to movement of the terminal 200, the mobile robot 100 follows the terminal 200 while maintaining a predetermined distance from the terminal 200. When the mobile robot 100 travels while following the position of the terminal 200, the mobile robot 100 may avoid an obstacle upon sensing the obstacle, such that the mobile robot 100 may move along a different path from that of the terminal 200. Additionally, the mobile robot 100 may bypass an area which is not passable, and may change a path according to a material of the floor or ground.

Figure 13:
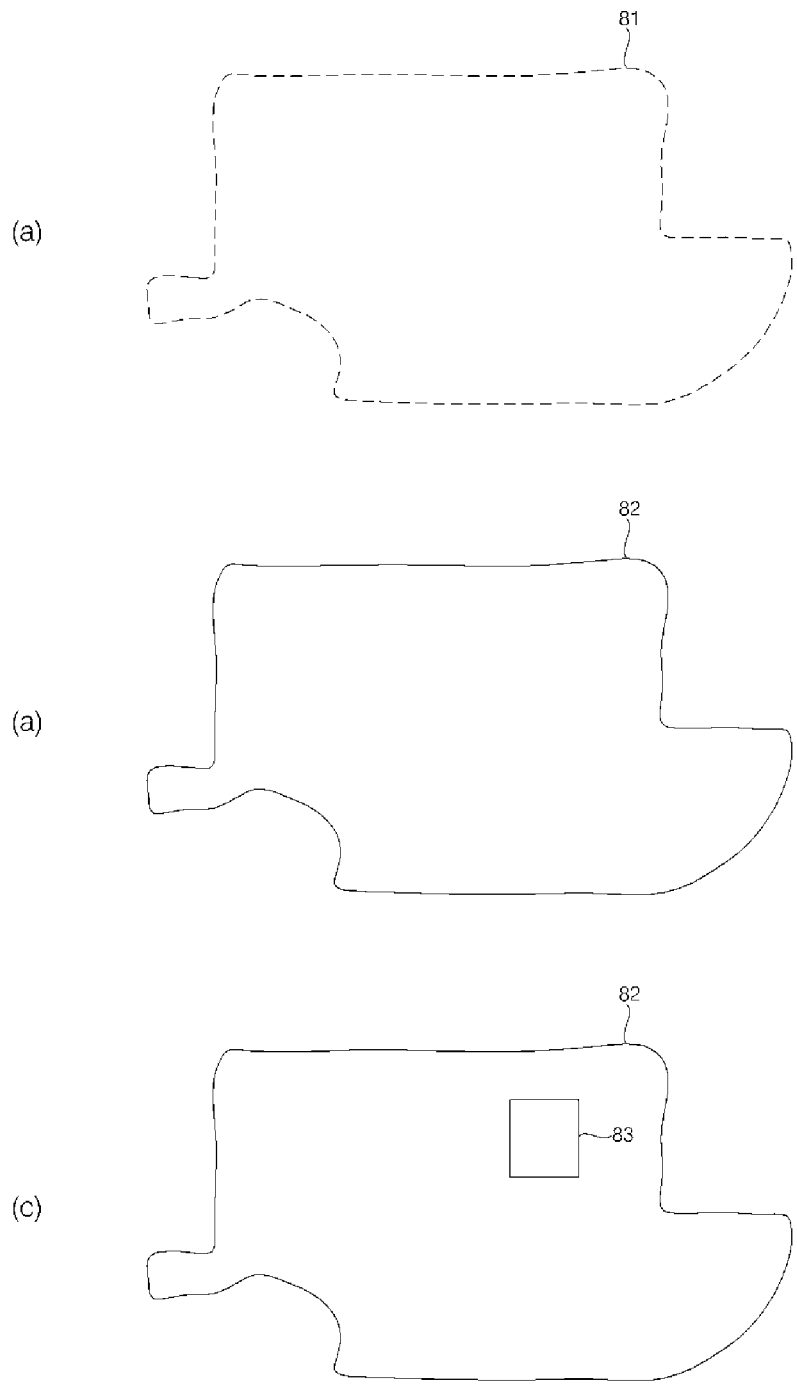
FIG. 13 is a diagram for explaining a method of setting a boundary according to a position change (or location change) of a terminal according to an example embodiment of the present disclosure.

FIG. 13 is a diagram for explaining a method of setting a boundary according to a position change (or location change) of a terminal according to an example embodiment of the present disclosure. Other embodiments and configurations may also be provided.

As shown in (a) of FIG. 13, a plurality of coordinates may be stored in the course of setting a traveling area. A moving trajectory in a predetermined direction is extracted using the plurality of coordinates, and some of the coordinates are selected while ignoring coordinates that deviate from the trajectory.

Accordingly, as shown in (b) of FIG. 13, one boundary 82 is extracted which is formed by connecting the selected coordinates in a straight line or a curved line.

Based on the set boundary, the mobile robot 100 may set an area inside the boundary as a traveling area. The mobile robot 100 may travel without moving outside the boundary 82.

As shown in (c) of FIG. 13, when there is an obstacle, having a size larger than a predetermined size, in the traveling area, a second boundary 83 may be set with respect to the position of the obstacle in the same method as a method of setting the traveling area, as described above.

In this example, a plurality of boundaries may be set in the traveling area, such that a plurality of areas are formed. Thus, a determination may be made of which area is selected as a traveling area from among the plurality of areas (formed by each of the respective boundary). As there is an obstacle in an area inside the second boundary 83, the inside area may be set as an area not passable and the outside area may be set as a traveling area.

Upon sensing an obstacle having a size smaller than a predetermined size, the mobile robot 100 may store the position of the obstacle and avoid the obstacle. Upon sensing a new obstacle having a size larger than a predetermined size, the mobile robot 100 may travel while avoiding the obstacle, and may set a new boundary for the position of the obstacle. In at last one example, the mobile robot 100 may request to reset a traveling area.

Figure 14:
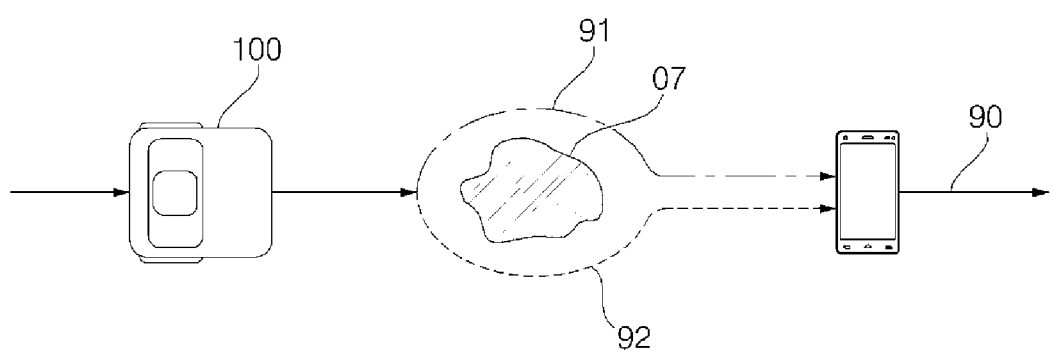
FIG. 14 is a diagram for explaining a method of changing an area of a mobile robot according to an example embodiment of the present disclosure.

FIG. 14 is a diagram for explaining a method of changing an area of a mobile robot according to an example embodiment of the present disclosure. Other embodiments and configurations may also be provided.

As shown in FIG. 14, upon sensing an obstacle 07 in a traveling direction of the mobile robot, when the mobile robot 100 moves while following the terminal 200 in order to set a traveling area, the mobile robot 100 may not move straight to follow the terminal 200.

As the mobile robot 100 is not to move straight, the mobile robot 100 may turn to the left or to the right to avoid the obstacle, and after avoiding the obstacle, the mobile robot 100 may again follow the terminal 200.

According to the size of an obstacle, the mobile robot 100 may travel by selecting either one of a left path 91 or a right path 92. Once the obstacle sensor determines a relative position of the mobile robot 100 with respect to the size of an obstacle, the mobile robot 100 may select a path that enables a short bypass path, and/or any one path by comparing with neighboring traveling environment. For example, when there is another nearby obstacle, the mobile robot 100 may select a direction in which there is a smaller number of obstacles.

The mobile robot 100 may transmit information on the sensed obstacles to the terminal 200, and once the terminal 200 selects any one bypass path, the mobile robot 100 may travel along the selected path.

Figure 15:
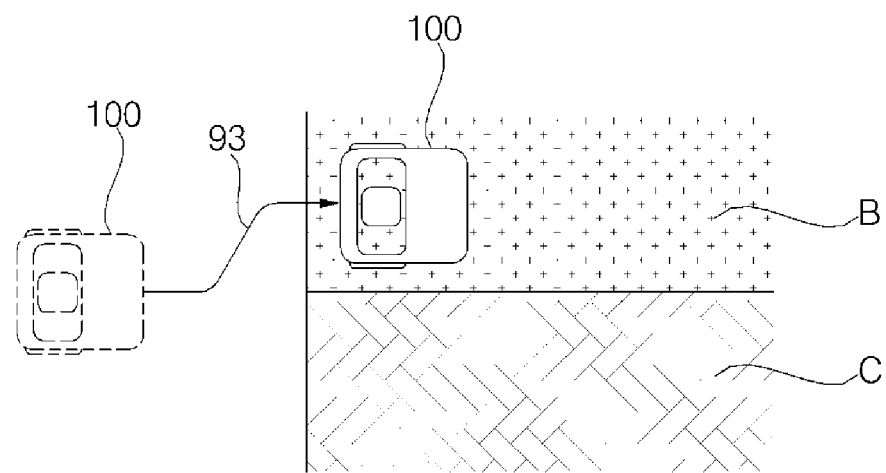
FIG. 15 is a diagram for explaining a method of moving a mobile robot according to an example embodiment of the present disclosure.

FIG. 15 is a diagram for explaining a method of moving a mobile robot according to an example embodiment of the present disclosure. Other embodiments and configurations may also be provided.

The mobile robot 100 may change a traveling path according to a ground condition while moving. The mobile robot 100 may include a sensor for sensing a material (or property) of a surface (such as a ground surface or a floor surface). Further, when the mobile robot 100 includes a camera, the mobile robot 100 may determine a material of a floor surface based on an image captured by the camera.

As shown in FIG. 15, when a floor C is made of a hard material, such as pavement or concrete, in addition to the lawn B, the mobile robot 100 may change a path 93 to avoid the floor of a hard material and to travel on the lawn.

A traveling area of the mobile robot 100 may also be set within a range of the lawn. Even when the terminal 200 moves over pavement (or hard surface), the mobile robot 100 may determine a ground condition or surface condition while traveling, and the mobile robot 100 may change a path to travel on the lawn.

For example, the mobile robot 100 may distinguish by color an area of the lawn B from the floor C of a hard material (such as pavement), such that the mobile robot 100 may extract an outline of each area to distinguish the areas, and may change a traveling path.

Figure 16:
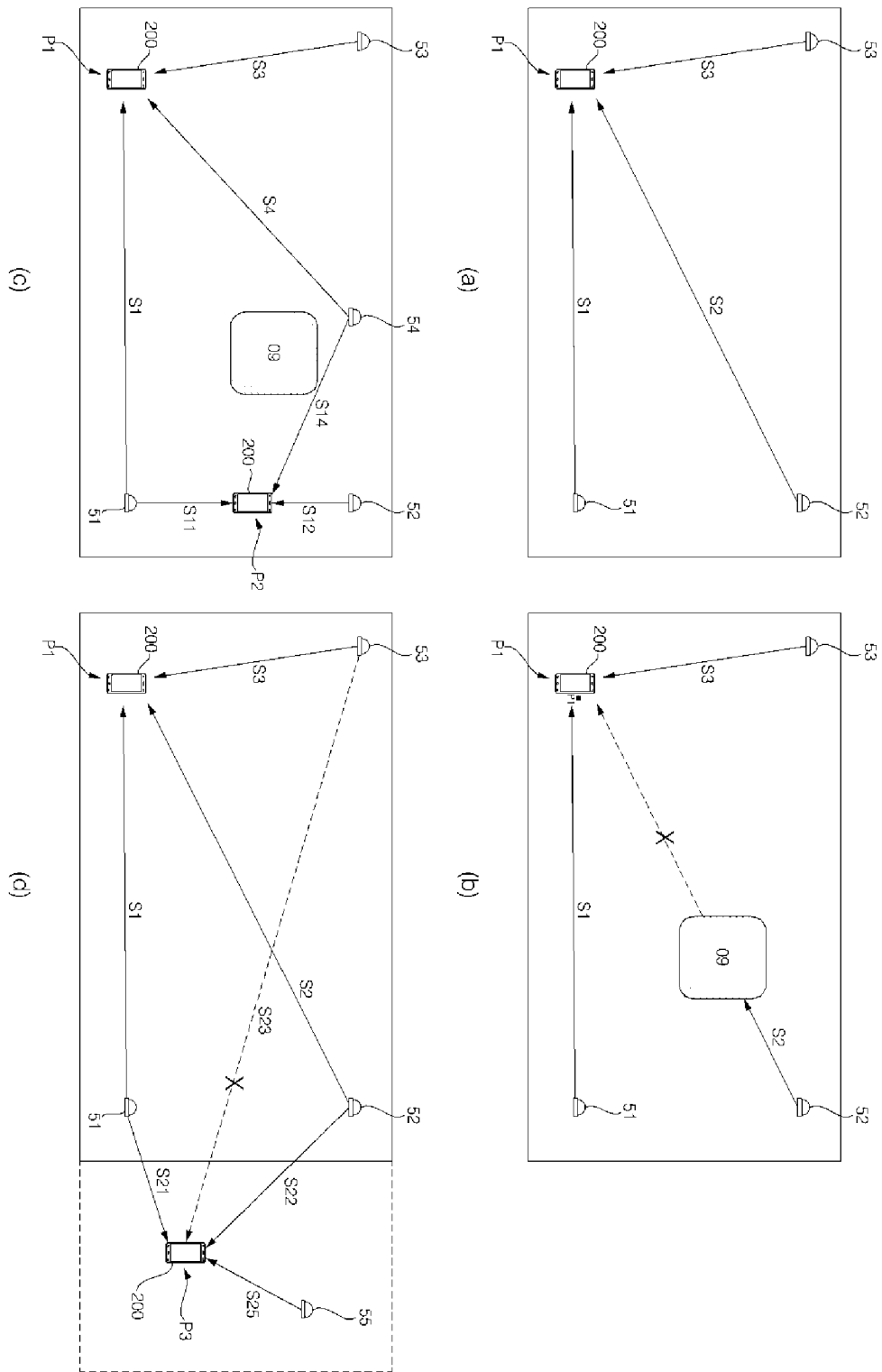
FIG. 16 is a diagram for explaining a method of calculating a position for setting an area according to an example embodiment of the present disclosure.

FIG. 16 is a diagram for explaining a method of calculating or determining a position for setting an area according to an example embodiment of the present disclosure. Other embodiments and configurations may also be provided.

As shown in (a) of FIG. 16, the mobile robot 100 or the terminal 200 may calculate (or determine) a position in an area using position information transmitters. The terminal 200 is shown therein and is used as an example in the following description, although the same may also be applied to the mobile robot 100.

The terminal 200 may determine a current position by receiving each of position signals S1, S2, S3 of the first to the third position information transmitters at a first point P1.

As described above, the terminal 200 may receive signals of the first to the third position information transmitters while moving for setting a traveling area, and the terminal may calculate (or determine) a distance to the position information transmitters by comparing power of the signals. Based on the positions of the three position information transmitters, the terminal 200 may calculate (or determine) a current position.

As the position changes, the terminal 200 and the mobile robot 100 may calculate (or determine) a current position by continuously receiving signals of the position information transmitters. The terminal 200 may store coordinate values as position information. The mobile robot 100 may also determine a current position by receiving signals of the position information transmitters, similarly to the terminal 200.

When the mobile robot 100 moves while following the terminal 200, the mobile robot 100 may move according to a position change of the terminal 200, and the mobile terminal 100 may change a position or an area based on data received from the terminal 200.

As shown in (b) of FIG. 16, when there is an obstacle having a size larger than a predetermined size, in a traveling area, the terminal 200 or the mobile robot 100 may not receive some of the signals of the position information transmitters.

For example, when the terminal 200 is located at the first point P1, the terminal 200 may receive position signals S1 and S3 of the first and the third position information transmitters, but may not receive the position signal S2 of the second position information transmitter due to a ninth obstacle 09 having a size larger than a predetermined size.

When an obstacle having a size larger than a predetermined size lies in a traveling area and interrupts reception of a position signal, the area may be excluded from a traveling area, and since it is difficult to receive signals due to the obstacle, the position of the position information transmitter may be changed or a new position information transmitter may be installed.

Signals may not be received normally due to the obstacle such that the terminal 200 may display guide information on a screen for adding a position information transmitter or changing the position of the position information transmitter.

When a position information transmitter is additionally installed, the terminal 200 evaluates a position to install the position information transmitter. At a position where the position information transmitter is planned to be installed, the terminal 200 may determine signal transmission and reception with other position information transmitters and determine whether there is a nearby obstacle that may interrupt signal reception, evaluate a sensitivity of signal transmission and reception at the current position, and determine whether the current position is suitable for installation.

The terminal 200 may evaluate, in a stepwise manner, whether an installation position of the position information transmitter is suitable. Upon determining that a sensitivity of signal reception is low, and/or there is difficulty in signal transmission due to a nearby obstacle, the terminal 200 may output guide information for guiding a user to install the position information transmitter at another position.

Based on information on signals received while moving, the terminal 200 may display recommendation of a predetermined number of installation candidate positions.

As shown in (c) of FIG. 16, when a fourth position information transmitter 54 is newly added, the terminal 200 may calculate or determine its position by receiving signals S1, S3, and S4 of the first, the third, and the fourth position information transmitters at the first point P1. While the terminal 200 may not receive the signal of the second position information transmitter, the terminal 200 may use position information of the other three position information transmitters, such that the terminal 200 may calculate the position.

When the terminal 200 moves to the second point P2, the terminal 200 may not receive a signal of the third position information transmitter at the second point P2, but may receive signals S11, S12, and S14 of the first, the second, and the fourth position information transmitters, such that the terminal 200 may calculate the position.

When an area is enlarged as shown in (d) of FIG. 16, a new position information transmitter 55 may be further installed.

The position signal transmitted from each of the position information transmitters has limited signal coverage, such that when the terminal 200 reaches a third point P3, the terminal 200 is located outside the signal coverage area of the third position information transmitter, and thus the terminal 200 may not receive the position signal of the third position information transmitter. Accordingly, by additionally providing a fifth position information transmitter for the enlarged area, the terminal 200 may receive signals S21, S22, and S25 of the first, the second, and the fifth position information transmitters at the third point P3, and thus the terminal 200 may calculate the position.

As described above, when the position information transmitter is additionally installed, the terminal 200 may determine whether an installation position of the new position information transmitter is suitable, and may display the determination.

Figure 17:
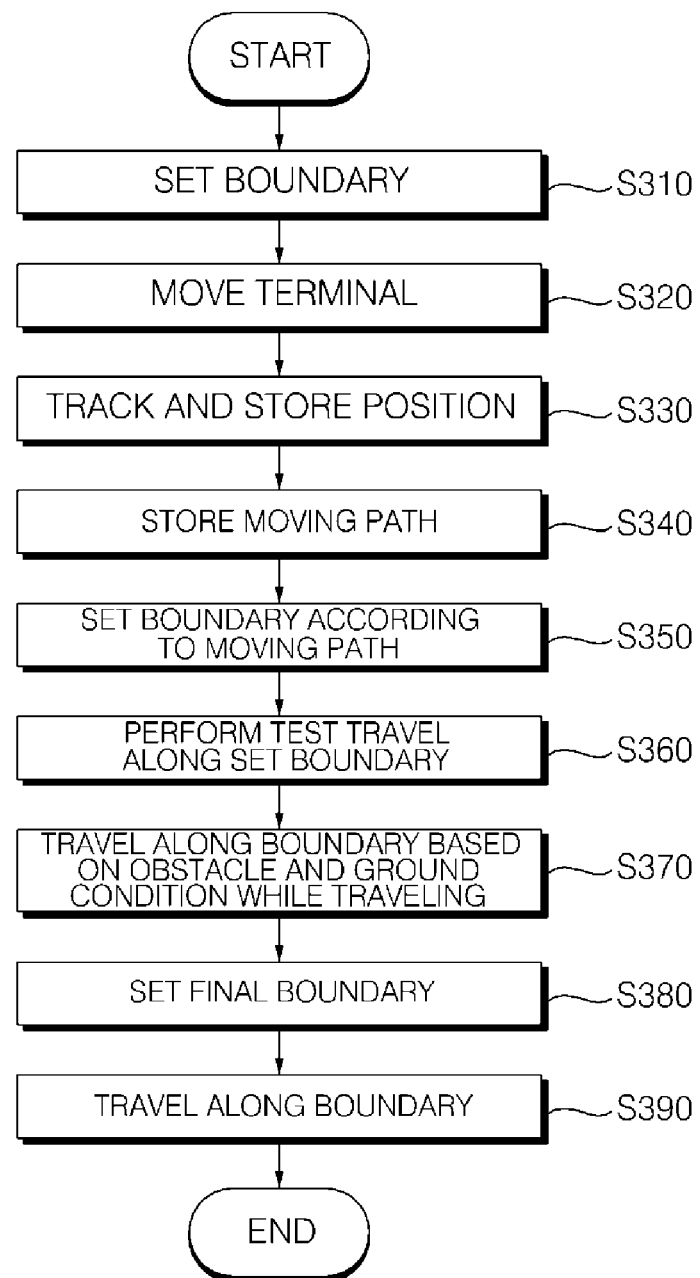
FIG. 17 is a flowchart showing a method of setting a traveling area of a mobile robot according to an example embodiment of the present disclosure.

FIG. 17 is a flowchart illustrating a method of setting a traveling area of a mobile robot according to an example embodiment of the present disclosure. Other embodiments and configurations may also be provided.

As shown in FIG. 17, when the mobile robot 100 travels to set a traveling area to mow the lawn, the terminal 200 may set a mode for setting a traveling area and a boundary thereof in S310. The mobile robot 100 may also perform the mode for setting a traveling area and a boundary thereof.

While moving in an area (S320), the terminal 200 may calculate (or determine) its current position based on a GPS signal or position information received from position information transmitters, and store the calculated current position in S330. The terminal 200 may calculate and store coordinates of positions in an area (outdoor area) where the terminal 200 currently moves.

The terminal 200 may calculate and accumulate position values according to movements, and store the accumulated position values in S340. The terminal 200 may then analyze the accumulated position values to set a boundary according to a moving path in S350. The terminal 200 may set an area inside the set boundary as a traveling area of the mobile robot 100. When the terminal 200 sets a new boundary in the traveling area in some cases (i.e., when there is an obstacle having a size larger than a predetermined size) and sets another boundary for the position, the terminal 200 may set an area outside the new boundary as a traveling area. The terminal 200 may display a menu of selections on a screen so that a user may select a traveling area from two areas divided by the boundary.

The mobile robot 100 may perform a test travel by traveling in the traveling area along the set boundary in S360.

Once the obstacle sensor senses an obstacle while moving, the mobile robot 100 may determine whether it is possible to pass through the obstacle. Upon determining that it is possible to pass through, the mobile robot 100 may pass through the obstacle, and upon determining that it is not possible, the mobile robot 100 may set a path to avoid the obstacle in S370.

The mobile robot 100 stores information on the obstacle sensed during test travel, and applies the stored obstacle information to the traveling area and the boundary thereof.

When a moving trajectory of the terminal 200 is different from a traveling path of the mobile robot 100 due to the obstacle, the mobile robot 100 may store information on a changed traveling path, so as to change the boundary when setting a traveling area. The mobile robot 100 may immediately change the set traveling area while traveling.

The mobile robot 100 may set a final boundary of a traveling area in S380 by changing the traveling area and the boundary based on information on the obstacle sensed during test travel and an actual traveling path of the mobile robot 100. When a plurality of boundaries are set, a traveling area may be selected from areas inside and outside the boundary through the terminal 200.

Upon setting a traveling area and a boundary, the mobile robot 100 may travel in the set traveling area while mowing the lawn without moving outside the boundary in S390. Upon sensing a new obstacle while traveling, the mobile robot 100 may change the traveling area based on obstacle information.

Figure 18:
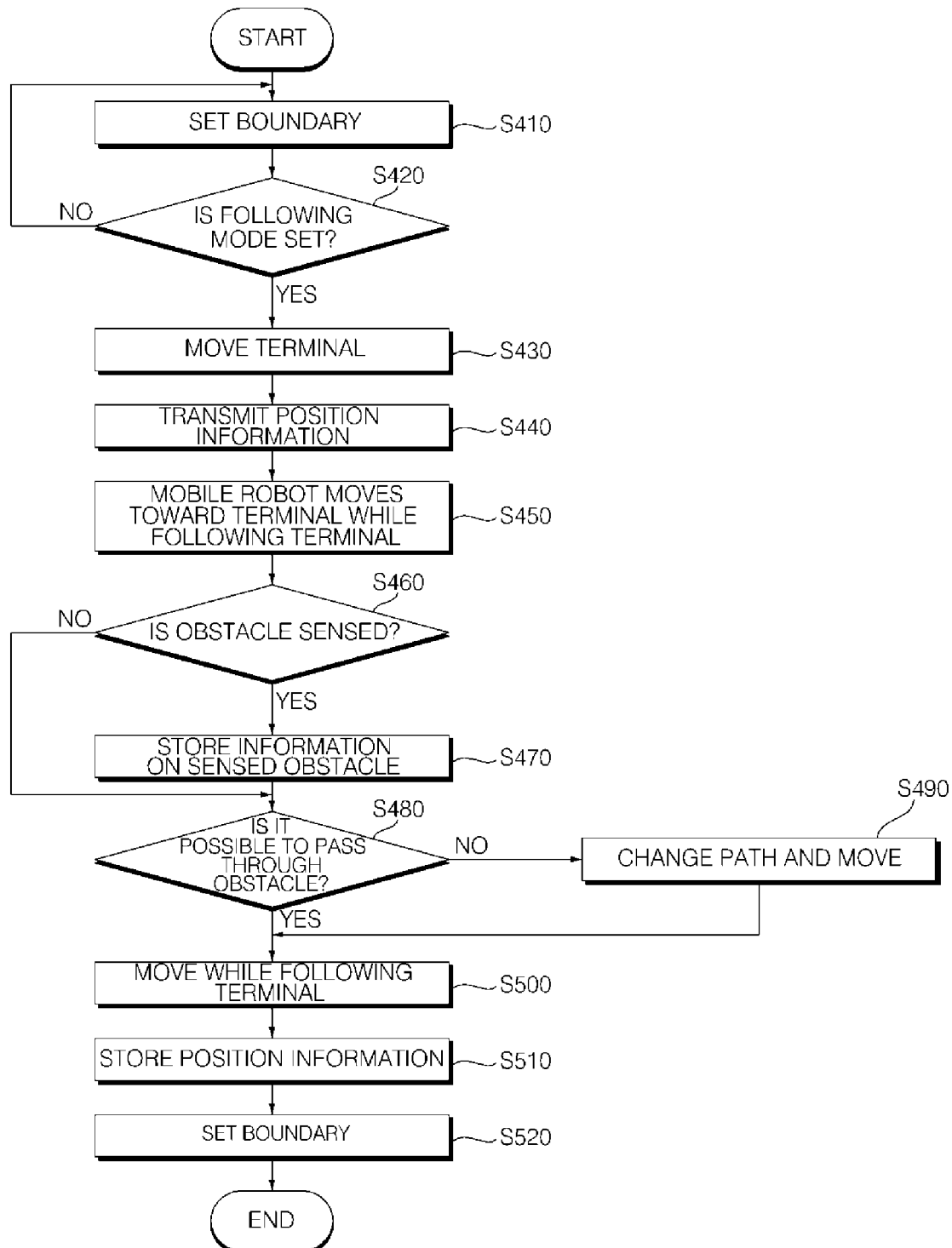
FIG. 18 is a flowchart showing a method of changing an area of a mobile robot according to an example embodiment of the present disclosure.

FIG. 18 is a flowchart illustrating a method of changing an area of a mobile robot according to an example embodiment of the present disclosure. Other embodiments and configurations may also be provided.

As shown in FIG. 18, when a boundary of a traveling area of the mobile robot 100 is set in S410, it is determined whether a following mode is set, in which the mobile robot moves while following the terminal 200.

When the following mode is set, and the terminal 200 starts to move in S420, the mobile robot 100 may start to move while following the terminal 200.

The terminal 200 may transmit a predetermined signal such as position information and/or the like in S440, and the mobile robot 100 may determine a position of the terminal 200 by analyzing the signal received from the terminal 200, and move toward the position of the terminal 200 as a destination by following the terminal 200 in S450.

The terminal 200 may transmit GPS position information, a UWB signal, an ultrasonic signal, and/or the like. By receiving the GPS position information, the mobile robot 100 may determine the position of the terminal 200, and/or the mobile robot 100 may determine a distance and a direction to the terminal 200 by using the UWB signal or the ultrasonic signal, to follow the terminal 200. When a predetermined marker is attached to the terminal 200, the mobile robot 100 may recognize the marker by using a camera and the like, to determine the position of the terminal 200 to follow the terminal 200.

The mobile robot 100 may maintain a predetermined distance from the terminal 200, and may move so as not to be spaced apart from the terminal 200 by more than a predetermined distance. When the terminal 200 is moved while being held by a user's hand, position information may be complicated, but as shown in FIG. 2, by analyzing a movement pattern based on the position information, and excluding position information having large deviation values, a moving trajectory of the terminal 200 may be calculated. The mobile robot 100 may move along the calculated moving trajectory of the terminal 200.

Upon sensing an obstacle by an obstacle sensor in a traveling direction while moving in S460, the mobile robot 100 may store information on the sensed obstacle in S470.

Upon determining that it is possible to pass through the obstacle, the mobile robot 100 may pass through the obstacle to move while following the terminal 200 along a moving trajectory of the terminal 200 in S500, and upon determining that it is not possible to pass through, the mobile robot 100 may set a path to avoid the obstacle in S490. The mobile robot 100 may determine whether it is possible to pass through the sensed obstacle. In order to mow the lawn near the obstacle, the mobile robot 100 may approaches the obstacle within a predetermined distance, mows the lawn near the obstacle, and then avoids the obstacle.

Upon avoiding the obstacle, the mobile robot 100 may move while following the terminal 200 along the moving trajectory of the terminal 200 in S500.

When a path is changed, the mobile robot 100 may store the changed path along with the obstacle information S510.

Upon completing traveling, when the moving trajectory of the terminal 200 is different from the traveling path of the mobile robot 100 due to the obstacle, the mobile robot 100 may store information on the changed traveling path, to change a boundary when setting a traveling area, and set a traveling area and a boundary based on the information in S520. Further, the mobile robot 100 may immediately change the set traveling area while traveling.

Upon setting the traveling area and the boundary, the mobile robot 100 may mow the lawn while traveling in the traveling area. Upon sensing a new obstacle having a size larger than a predetermined size, the mobile robot 100 may request the terminal 200 to set a new traveling area.

It may be an object of the present disclosure to provide a mobile robot and a method of controlling the same, in which a traveling area of the mobile robot may be set using position information, and the set traveling area may be easily changed.

In accordance with at least one aspect, a mobile robot include: a main body; a traveling unit configured to move the main body; a communicator configured to communicate with a terminal which moves along a predetermined path in any portion of an area; and a controller configured to set a virtual boundary based on position information received from the terminal, and to set an area of any one side of the boundary as a traveling area. The controller may control the traveling unit so that the main body moves within the traveling area without moving outside the boundary.

The controller may set the boundary by connecting the position information in a straight line or a curved line. The controller may set a plurality of boundaries, and may set at least one of areas formed by the plurality of boundaries as the traveling area.

The mobile robot may further include an obstacle sensor configured to sense an obstacle located in the traveling direction, and the controller may change the boundary based on obstacle information sensed by the obstacle sensor while the mobile robot travels.

In accordance with at least one aspect, a mobile robot may include: a main body; a traveling unit configured to move the main body; a position sensor (including a plurality of sensors) to sense position information; and a controller configured to set a virtual boundary based on the position information, and to set an area of any one side of the boundary as a traveling area. The controller may control the traveling unit to follow the terminal while maintaining a predetermined distance from the terminal which moves along a predetermined path in any portion of an area, and sets the boundary based on the position information calculated by the position sensor while following the terminal. Upon setting the boundary, the controller may control the main body to move within the traveling area without moving outside the boundary.

The terminal may store position information collected while moving along the path, transmit the position information to the mobile robot, and the controller may set the boundary based on the position information received from the terminal.

The mobile robot may include the position sensor (including a plurality of sensors). The controller may control the traveling unit to follow the terminal while maintaining a predetermined distance from the terminal, and may set the boundary based on the position information calculated by the position sensor.

In accordance with at least one aspect, a method of controlling a mobile robot may include: receiving position information from a terminal which moves along a predetermined path in an area; analyzing, by the mobile robot, the received position information to set a virtual boundary by connecting each point of the position information; setting any one of areas formed by the boundary as a traveling area of the mobile robot; and traveling in the traveling area without moving outside the boundary.

The method may further include, by the mobile robot, performing test travel by traveling the traveling area formed by the boundary.

The method may further include, by the mobile robot, changing the boundary according to obstacle information sensed during the test travel.

In accordance with at least one aspect, a method of controlling a mobile robot may include: by a terminal, moving along a predetermined path in an area; by the mobile robot, moving while following the terminal; analyzing position information to set a virtual boundary by connecting each point of the position information; setting any one of areas formed by the boundary as a traveling area of the mobile robot; and traveling in the traveling area without moving outside the boundary.

The method may further include, by the mobile robot, receiving a signal transmitted from the terminal, and determining a direction and a position of the terminal to follow the terminal.

In the mobile robot and method of controlling the same according to the present disclosure, a traveling area of the mobile robot may be set using collected position information, and a boundary of the traveling area may be changed while the mobile robot travels in the traveling area, such that the traveling area may be set and changed easily.

In the present disclosure, the mobile robot receives position information from the terminal, or the mobile robot moves while following the terminal, such that a boundary of the traveling area may be set easily using the received position information, and the mobile robot may travel in the traveling area formed by the boundary.

In the present disclosure, the mobile robot may correct a position error while directly traveling, and may reflect information on sensed obstacles in setting a traveling area, such that a traveling area appropriate for a traveling environment of the mobile robot may be set.

In the present disclosure, even when a work area is reduced or enlarged, a position information transmitter may be further provided, such that a boundary may be reset easily for an enlarged area. Further, by evaluating an installation position for the position information transmitter in an area, a position that facilitates signal transmission and reception may be determined for installation, thereby preventing a problem that an obstacle interrupts signal reception, and position information may be confirmed easily, thereby improving accuracy of positions.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile robot, comprising:
    a main body;
    an obstacle sensor configured to sense an obstacle;
    a traveling unit configured to move the main body;
    a communicator configured to communicate with a terminal, wherein the terminal to move along a path at an area; and
    a controller configured to set a boundary based on position information received from the terminal, and to set a traveling area based on the set boundary,
    wherein the controller is configured to:
        perform a test travel within the traveling area set by the boundary,
        change the boundary based on obstacle information sensed by the obstacle sensor during the test travel, and
        control the traveling unit to provide movement of the main body within the traveling area without allowing the main body to move outside the boundary.

2. The mobile robot of claim 1, wherein the terminal is configured to:
    set a reference position in the area,
    store position information determined based on the reference position while the terminal is moving along the path, and
    transmit, to the mobile robot, the stored position information; and
    upon receiving the position information from the terminal, the controller is to set the boundary based on the received position information, and in response to the boundary being set, the controller is to receive data on the boundary and is to set the traveling area based on the received data.

3. The mobile robot of claim 1, wherein the controller is configured to set a plurality of boundaries, and to set the traveling area based on at least one of a plurality of areas formed by the plurality of boundaries.

4. A mobile robot, comprising:
a traveling unit configured to move a body;
a position sensor to sense position information;
an obstacle sensor configured to sense an obstacle;
a controller configured to set a boundary based on the position information, and to set a traveling area based on the set boundary,
wherein the controller is configured to:
control the traveling unit to follow a terminal based on information received from the terminal, while maintaining less than a predetermined distance from the terminal that moves along a first path in an area,
obtain obstacle information from the obstacle sensor while the mobile robot is following the terminal;
change a traveling path of the mobile robot based on the obtained obstacle information;
control the traveling unit to avoid the obstacle and move along a second path which is different from the first path of the terminal,
set the boundary based on the sensed position information while the mobile robot is following the terminal, and
control the traveling unit to provide movement of the mobile robot within the traveling area and to prevent the mobile robot from moving to outside the boundary.

5. The mobile robot of claim 4, wherein the controller is configured to determine a direction of the terminal and a position of the terminal, based on the information and calculate a relative position with respect to the position of the terminal, and
the controller is configured to control the traveling unit such that the mobile robot is to follow the terminal.

6. The mobile robot of claim 5, wherein the controller is configured to set a location of a charging station, wherein the charging station is to charge the mobile robot.

7. The mobile robot of claim 6, wherein when the location of the charging station is outside the boundary and the mobile robot is to receive a charging, the controller is to control the mobile robot to move to the charging station.

8. The mobile robot of claim 6, wherein the controller is configured to:
set a moving area between a point of the boundary and the charging station,
change the traveling area to include the moving area, and
control the mobile robot to move through the moving area to the charging station.

9. The mobile robot of claim 6, wherein the controller is configured to change the boundary such that the charging station is located within the traveling area.

10. The mobile robot of claim 4,
wherein the controller is configured to:
determine a surface property of a surface on which the mobile robot is to move; and
change a traveling path of the mobile robot based on the determined surface property, wherein to change the traveling path includes the traveling unit to control the mobile robot to move along a third path which is different from the first path of the terminal.

11. The mobile robot of claim 4, wherein:
the controller is configured to set a reference position in the area; and
the position sensor is to receive at least one of a GPS signal, an Ultra Wide Band (UWB) signal, an ultrasonic signal, and an infrared signal, and the position sensor is to determine a position of the mobile robot based at least on the reference position.

12. The mobile robot of claim 4, wherein:
the position sensor is to receive, from the terminal, a plurality of Ultra Wide Band (UWB) signals; and
the controller is configured to:
determine variable distances based on the plurality of received signals,
estimate a facing direction of the body with respect to a relative distance between the terminal and the body and a reference line for determining the relative distance, and
determine a relative position between the terminal and the body based on the estimated facing direction and at least one variable distance.

13. A method of controlling a mobile robot, the method comprising:
receiving position information from a terminal that moves along a path at an area;
setting, by the mobile robot, a boundary based on the received position information, wherein the setting of the boundary includes connecting a plurality of different positions of the position information;
setting a traveling area of the mobile robot based on the set boundary;
performing, by the mobile robot, a test travel within the traveling area set by the boundary;
changing the boundary based on obstacle information sensed during the test travel; and
controlling the mobile robot to provide movement within the traveling area and without allowing the mobile robot to move outside the boundary.

14. The method of claim 13, comprising determining, by the mobile robot, the position information based on a reference position.

15. The method of claim 13, comprising:
setting a plurality of boundaries; and
setting, by the mobile robot, the traveling area based on at least one of a plurality of areas formed by the plurality of boundaries.

16. A method of controlling a mobile robot, the method comprising:
moving a terminal along a path at an area;
moving the mobile robot by following the terminal based on received position information from the terminal;
receiving position information of the mobile robot;
obtaining obstacle information from an obstacle sensor while following the terminal;
changing a traveling path of the mobile robot based on the obstacle information;
avoiding an obstacle and moving along a second path which is different from a first path of the terminal;
setting, at the mobile robot, a boundary based on the received position information, wherein the setting of the boundary includes connecting a plurality of different positions of the position information;
setting a traveling area of the mobile robot based the set boundary; and
controlling movement of the mobile robot to be within the traveling area and to prevent the mobile robot from moving outside the boundary.

17. The method of claim 16, further comprising:
setting a plurality of boundaries at the area;
setting the traveling area of the mobile robot based on at least one of a plurality of areas formed by the plurality of boundaries; and
changing the boundary based on obstacle information obtained while the mobile robot moves within the traveling area.

18. The method of claim 17, further comprising:
setting a location of a charging station; and
controlling the mobile robot to move to the charging station based on a specific charge of the mobile robot.

19. The method of claim 17, further comprising:
setting a location of a charging station located outside the boundary; and
setting a moving area between a point of the boundary and the charging station; and
in response to a need for a charging, controlling the mobile robot to move, through the moving area, to the charging station.

* * * * *